United States Patent [19]
Nishikawa

[11] Patent Number: 5,526,490
[45] Date of Patent: Jun. 11, 1996

[54] DATA TRANSFER CONTROL UNIT USING A CONTROL CIRCUIT TO ACHIEVE HIGH SPEED DATA TRANSFER

[75] Inventor: Junji Nishikawa, Osaka, Japan

[73] Assignee: Matsushita Electric Industrial Co., Ltd., Osaka, Japan

[21] Appl. No.: 104,583

[22] Filed: Aug. 11, 1993

[30] Foreign Application Priority Data

Aug. 17, 1992 [JP] Japan ................................. 4-217618

[51] Int. Cl.⁶ ........................................... G06F 15/163
[52] U.S. Cl. ........................... 395/200.06; 364/DIG. 1;
364/DIG. 2; 364/222.2; 364/229; 364/229.2;
364/232.9; 364/238.5; 364/240; 364/241.9;
364/247; 364/259; 364/259.2; 364/260;
364/260.1; 364/265; 364/266.4; 364/271;
364/271.2; 364/280; 364/280.8; 364/284;
364/284.2; 364/284.4
[58] Field of Search ................ 364/DIG. 1 MS File,
364/DIG. 2 MS File; 395/200, 800, 500,
200.01, 200.06

[56] References Cited

U.S. PATENT DOCUMENTS 4,223,380 9/1980 Antonaccio et al. ................... 395/200
4,513,370 4/1985 Ziv et al. ................................. 395/200

FOREIGN PATENT DOCUMENTS 63-44267 2/1988 Japan .
1-62759 3/1989 Japan .
1-283664 11/1989 Japan .

Primary Examiner—Robert B. Harrell
Attorney, Agent, or Firm—Willian Brinks Hofer Gilson & Lione

[57] ABSTRACT

A processor element is provided with a data transfer control circuit that sends out an address count pulse (ACNT) onto a control bus. N data transfer channels each contain a data transfer buffer and a buffer control circuit. The buffer control circuit comprises an identification number register, an input/output control circuit, an address counter, and a comparison circuit. The address counter holds a channel address that is preset in such a way as to allow each channel to take the same channel address number, and increments such a channel address each time it receives the ACNT. If the identification number and the channel address coincide, the data transfer buffer in the same channel is selected. The number of interconnecting wires can be reduced and the transfer of data can be carried out at a high transfer rate, in a multiprocessor system whose linking network between each processor is formed by a series of data transfer channels.

10 Claims, 21 Drawing Sheets

DATA TRANSFER CONTROL UNIT USING A CONTROL CIRCUIT TO ACHIEVE HIGH SPEED DATA TRANSFER

BACKGROUND OF THE INVENTION

This invention relates to the field of data transfer units in which one elements is connected by a common data transfer bus to a series of elements. This invention further relates to the field of multiprocessor systems making use of this type of data transfer unit. High-performance parallel processing systems using a linking network interconnecting plural processors are known in the art In parallel processing, data transfer between each processor is required, and it must be carried out at a high transfer rate and high efficiency. As the degree of parallel processing increases, the linking network between processors increases in size. Accordingly, it is important to reduce to a minimum the number of interconnecting wires required. Further, it is also important to uniquely identify each processor by means of the assignment of processor identification numbers. These identification numbers are used such time as describing the assignment of data to each processor and the transfer of data between each processor. If a data transfer unit employs a certain topology in which a data source is connected by a common bus to plural data destinations, this very much contributes to reducing the number of interconnecting wires required. FIG. 23 outlines the organization of a conventional data transfer unit that uses an address bus to identify each data destination. This conventional data transfer unit comprises a processor element 10, a data bus 40, an address bus 41, and a plurality of input/output (I/0) ports 42. The processor element 10 selects one of the plurality of I/0 ports 42 as the data destination via the address bus 41. Japanese Patent Application, published under Pub. No. 64-62759, shows an example in which an address bus is provided. This application shows a technique in which block numbers are fed to identify each data destination through an address bus, during the broadcasting of data. Meanwhile, there is proposed a technique using no address buses. For instance, Japanese Patent Application, published under Pub. No. 63-44267, discloses a data transfer unit in which one master module is connected by a serial data bus and by a clock signal line to each of a plurality of slave modules. In this application, a header 43, placed at the head of data 44, identifies each data destination (see FIG. 24). Each slave module permits separation of a header 43 from data 44 on the serial data bus, thereby making a decision of whether or not the data 44 is addressed to that slave module from the header 43. Japanese Patent Application, published under Pub. No. 1-283664, is another example in which data accompanied by a header is used. Generally, several ways of setting processor identification numbers have been employed. In one method a host computer sets an identification number to each processor under the host computer's control, and in an other extra hardware for outputting a fixed identification number is provided to every processor.

The foregoing prior art techniques, however, present some drawbacks. For example, the conventional data transfer unit using an address bus to identify each data destination has a problem that the number of interconnecting wires cannot be reduced suitably. Further, another problem will be presented when expanding an existing system. That is, the number of address buslines must be increased.

The conventional data transfer unit in which a header is placed at the head of the data has an advantage that the number of interconnecting wires can be reduced suitably because no address buses are provided. This technique, however, suffers a disadvantage that data cannot be transferred at high speed. The reason for the drop in data transfer rate is the provision of a header which must be placed at the head of each data even when sending out data to the same destination every time, even when sequentially selecting data destinations, or even when carrying out the broadcasting of data.

To sum up, an attempt at reducing the number of interconnecting wires conflicts with accomplishing a high data transfer rate. This means that a conventional multiprocessor, too, suffers from the same problem. Conventional multiprocessor systems have several problems with regard to the way of setting an identification number for each processor. If a host computer sets processor identification numbers, a specialized program is required for the host computer to assign the identification number, otherwise extra hardware for outputting a fixed identification number is required in every processor.

SUMMARY OF THE INVENTION

It is an object of the present invention to provide improved data transfer units. In accordance with a data transfer unit of the invention, the number of interconnecting wires required is reduced, and the transfer of data is carried out at a high transfer rate. It is another object of this invention to provide improved multiprocessor systems making use of this type of data transfer units. It is still another object of the invention to realize the automatic setting of identification numbers for each processor using plural data transfer channels forming a linking network in a multiprocessor.

The present invention provides an improvement in a data transfer unit in which a single data transfer control circuit and a plurality of data transfer channels each of which contains a data transfer buffer are connected by a common data bus as well as by a common control bus. These data transfer channels are assigned different identification numbers so that a transfer of data between the data transfer control circuit and a data transfer channel is carried out only when the latter's identification number coincides with a channel address which is updated by a constant value via the control bus. More specifically, the present invention provides a first data transfer unit which has a plurality of data transfer channel blocks each housing a data transfer channel. Each data transfer channel comprises an identification number holding means, a channel address holding means, and a buffer selecting means. The identification number holding means holds an identification number to identify each data transfer channel. The channel address holding means holds a channel address which is set in such a way to allow each data transfer channel to take the same channel address number and which, together with the other channel addresses set to the other data transfer channels, is updated by a constant value each time when receiving an address count pulse from the data transfer control circuit through the control bus. The buffer selecting means selects a data transfer buffer in the same data transfer channel as the destination of data being transferred from the data transfer control circuit through the data bus, when the identification number and the channel address, held by the identification holding means and the channel address holding means respectively, coincide.

In accordance with the first data transfer unit, if, for example, N data transfer channels hold identification numbers from 1 to N, and if each channel address becomes incremented simultaneously by a 1 for every receipt of an address count pulse on the control bus after the channel addresses held by all the data transfer channel are initialized to all 1's, this allows the data transfer buffers of the data transfer channels to be selected sequentially as the destination of data being transferred from the data transfer control circuit. It is therefore possible to transfer data sequentially using neither an address bus nor a header. Thus, an improved data transfer unit having both a reduced number of interconnecting wires and the transfer of data at high speed coexist with is achievable. Additionally, the updating of the channel address is controlled by an address count pulse on the control bus, so that it is easier to select data destinations with broad flexibility. For example, it is possible to skip a certain data destination if the channel address is kept updated. By bringing the updating of the channel address to a stop, it is feasible to send and receive plural items of data to and from the same data transfer channel. Further, if N data transfer channels each hold a two as a channel address, and if these channel addresses are changed to all 5's, a data transfer channel which is assigned an identification number of 5 is selected after a data transfer channel which is assigned an identification number of 2. This, in other words, enables a data transfer control circuit to randomly select as the destination of data one of the N data transfer channels.

The present invention provides a second data transfer unit which has a plurality of data transfer channel blocks each housing a data transfer channel. Each data transfer channel comprises an identification number holding means, a data count controlling means, a channel address holding means, and a buffer selecting means. The identification number holding means holds an identification number to identify each data transfer channel. The data count controlling means holds an integer number which is reset in such a way as to allow each data transfer channel to take the same integer number, updates such an integer value by a constant value in response to a data strobe pulse which is received from a data transfer control circuit through a control bus with data placed onto a data bus from the data transfer control circuit, and outputs a count pulse when the integer number updated reaches a predefined value. The channel address holding means holds a channel address which is set in such a way as to allow each transfer data channel to take the same channel address number, and which, together with the other channel addresses set to the other data transfer channels, is updated by a constant value for every receipt of a count pulse from the data count controlling means. The buffer selecting means selects a data transfer buffer in the same data transfer channel as the destination of data being transferred from the data transfer control circuit through the data bus, when the identification number and the channel address, held by the identification holding means and the channel address holding means respectively, coincide.

In accordance with the second data transfer unit, the updating of the channel address is controlled by a data strobe pulse on the control bus. This is very convenient in transferring plural items of data from the data transfer control circuit to each data transfer channel. For example, in the case of transferring two items of data to every data transfer channel, the data transfer control circuit places a data strobe pulse onto the control bus each time it sends an item of data down the data bus, on such conditions that (a) N data transfer channels hold identification numbers 1, 2, . . . N, respectively, (b) the values held by all the data count control means are reset to zeros, and (c) the channel addresses held by all the channel address holding means are initialized to all 1's. In the first place, the data transfer buffer in the data channel which is assigned an identification number of 1 is selected. Upon such a selected data transfer buffer having received two items of data, the data count control means comes to have a count value of two thereby sending out a count pulse so as to update the channel address held by the channel address holding means to a 2. At this point in time, the channel address of the data transfer channel numbered 2, too, is updated to a two. Accordingly, the data transfer channel numbered 2 is now selected as the destination of data. In this way, a transfer of two items of data is sequentially carried out with respect to the remaining data transfer channels. The data count control means controls the data count being transferred. The channel address holding means controls the channel address updating.

The present invention further provides a multiprocessor system. In this multiprocessor system, N by N data transfer channels forming a linking network for N processor elements are assigned different identification numbers and a transfer of data between the processor element data and a data transfer channel is carried out only when the latter's identification number coincides with the channel address which is updated by a constant value. It is therefore possible to transfer data sequentially between any processor elements with using neither an address bus nor a header.

Further, each processor element is given its own identification number (i.e. a data transfer channel identification number) on the basis of information held in a linking network. Because of this, unlike the conventional techniques, there is no need to prepare a specialized program for a host computer to set the identification number, or the provision of extra hardware used to set the identification number is not required. Accordingly, it is possible to automatically set an identification number to each processor element.

DETAILED DESCRIPTION OF THE INVENTION

Examples of the present invention are described by reference to the accompanying drawings. It is to be noted that, in the specification, "a data transfer channel 20-IDn means data transfer channel 20 is assigned an identification number n.

EMBODIMENT

Now referring to FIGS. 1 to 7, a data transfer unit of the first embodiment is described.

Figure 1:
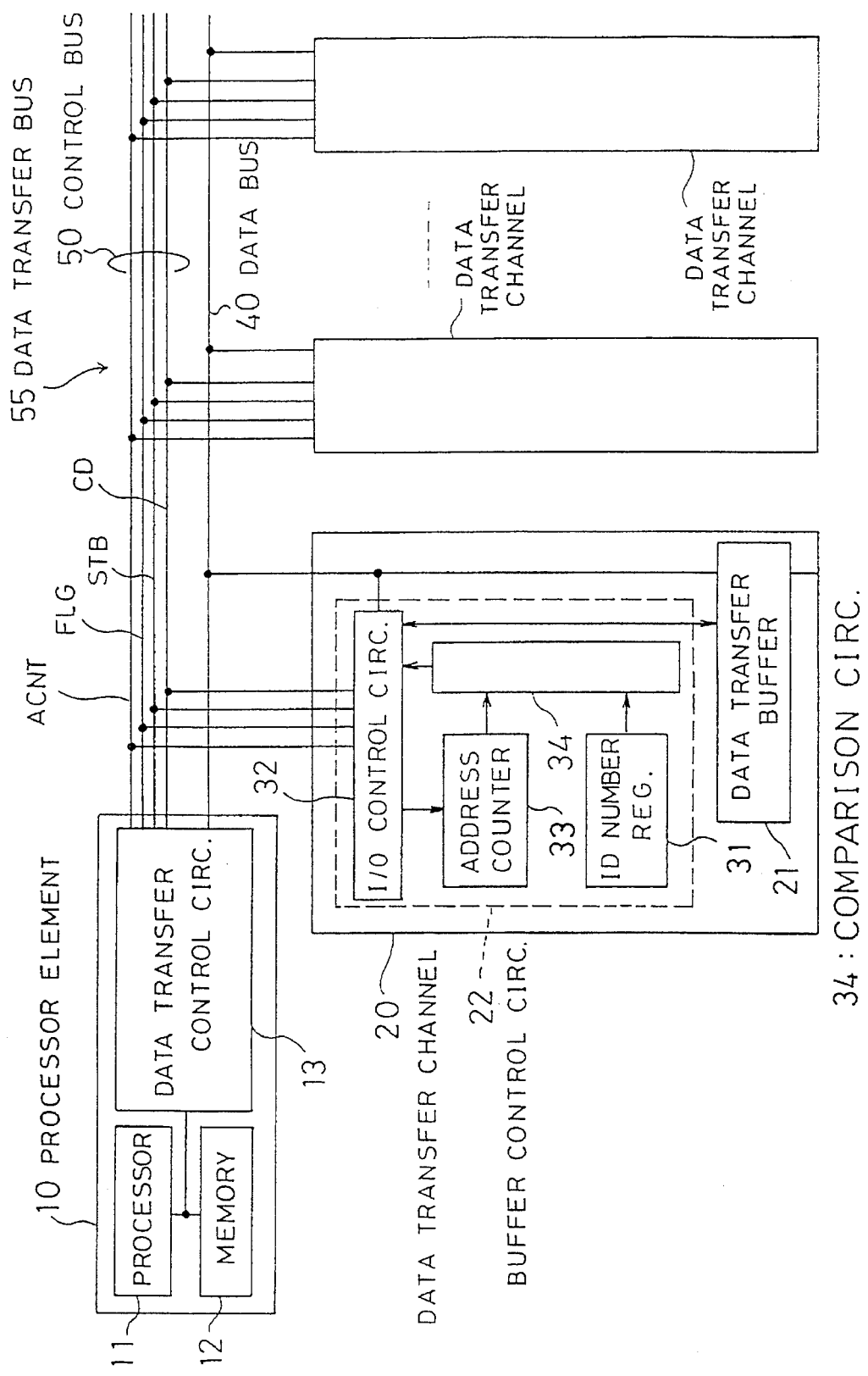
FIG. 1 is a block diagram showing a data transfer unit of a first example of the present invention.

FIG. 1 is a block diagram showing the organization of a data transfer unit of the present embodiment. This data transfer unit comprises a single processor element 10 and N data transfer channels 20. The processor element 10 and the data transfer channel 20 are connected together by a common data transfer bus 55 formed by a data bus 40 and a control bus 50. The processor element 10 has a processor 11, a memory 12, and a data transfer control circuit Data transfer between the memory 12 and each data transfer channel 20 is under the data transfer control circuit's 13 control. The data transfer control circuit 13 places onto the control bus 50 three different signals, i.e. an address count pulse (ACNT), a data strobe pulse (STB), and a command data signal (CD), whereas each data transfer channel 20 returns a flag signal (FLG) to the data transfer control circuit 13.

Each data transfer channel 20 has a data transfer buffer 21 and a buffer control circuit 22. The buffer control circuit 22 contains an identification number register 31, an input/output (I/0) control circuit 32, an address counter 33, and a comparison circuit 34. The identification number register 31 holds a unique data transfer channel identification number. Prior to the start of a data transfer, each identification number register 31 is assigned any one of identification numbers from 1 to N through an identification number inputting line, in the order in which the N data transfer channels 20 are arranged. Each address counter 33 holds an integer number as a channel address which is set by the data transfer control circuit 13 through the data bus 40 and through the I/O control circuit 32 prior to the start of a data transfer in such a way as to allow each data transfer channel-20 to have the same channel address number. Further, the address counter 33 increments a channel address number held therein by one each time it receives ACNT from the data transfer control circuit 13. The comparison circuit 34 compares the identification number held by the identification number register 31 with the channel address held by the address counter 33. When an equal comparison occurs, the comparison circuit 34 makes the I/0 control circuit 32 select the data transfer buffer 21 in the same block as the destination of data sent from the data transfer control circuit 13.

Figure 2:
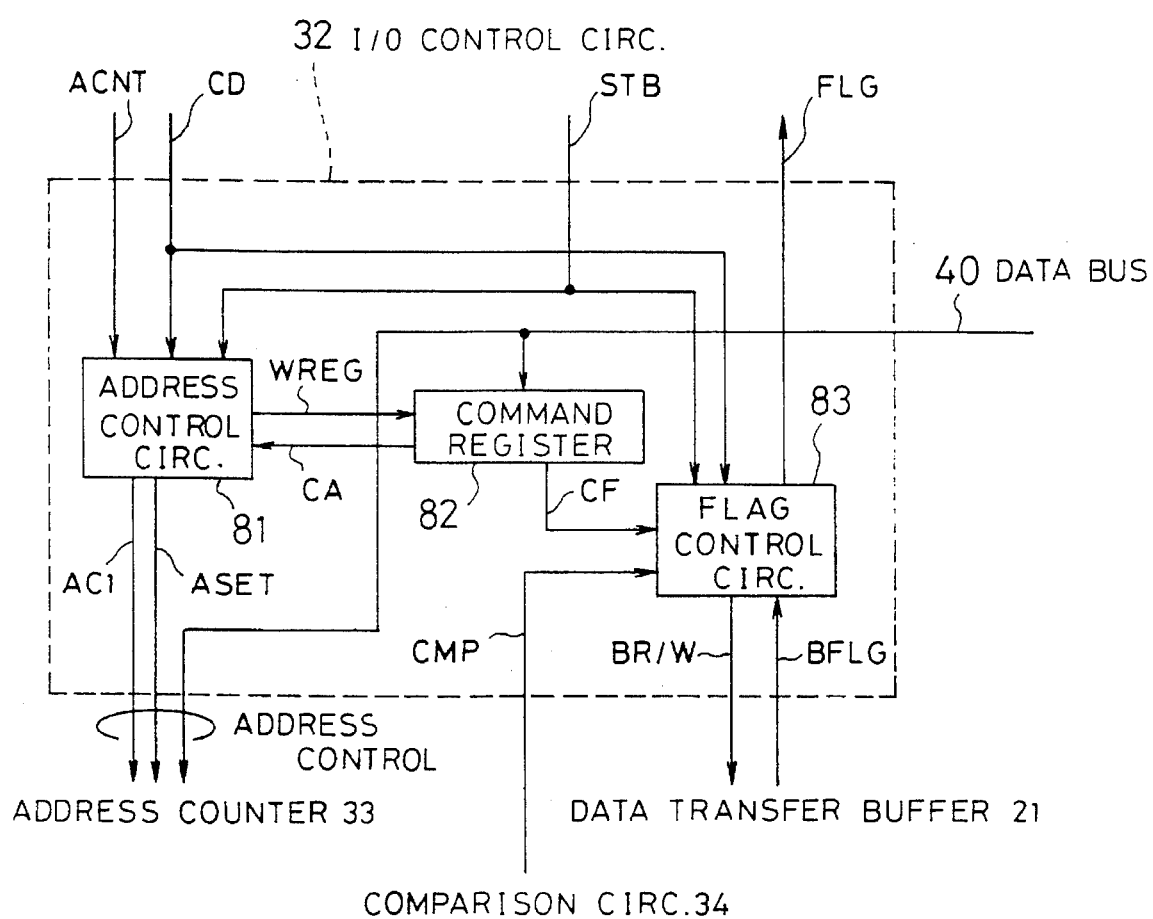
FIG. 2 is a block diagram showing an input/output control circuit in one data transfer channel of FIG. 1.

FIG. 2 shows the internal organization of the I/0 control circuit 32. The I/0 control circuit 32 has an address control circuit 81, a command register 82, and a flag control circuit 83. In the figure: AC1 represents an internal count pulse on the basis of an address count pulse that is represented by ACNT; ASET is a channel address setting signal used to send to the address counter 33 an integer number transferred via the data bus 40; WREG is a register write control signal used to send to the command register 82 a command transferred via the data bus 40; CA is a command with respect to the address control circuit 81; CF is a command with respect to the flag control circuit 83; CMP is a signal indicative of comparison results by the comparison circuit 34; BR/W is a write/read control line of the data transfer buffer 21; and BFLG is a flag (full/empty) line of the data transfer buffer 21. FLG, placed onto the control bus 50 from the flag control circuit 83, indicates a "full" or a "not-full" in writing to the data transfer buffer 21, while on the other hand it indicates an "empty" or a "not-empty" in reading from the data transfer buffer 21. In the case of a not-full, the data transfer buffer 21 is write enabled. In the case of a not-empty, the data transfer buffer 21 is read enabled. The I/0 control circuit 32, each time the data transfer control circuit 13 sends a command or data down the data bus 40, receives a STB (data strobe pulse) representing the timing for the I/O control circuit 32 when to place such a command or data. It is possible to tell a command from data on the data bus 40 from the logical level of CD (command data signal).

The operations of the above-described data transfer unit in various modes are explained by reference to FIGS. 3 to 7. FLG and STB are shown only when required.

Figure 3:
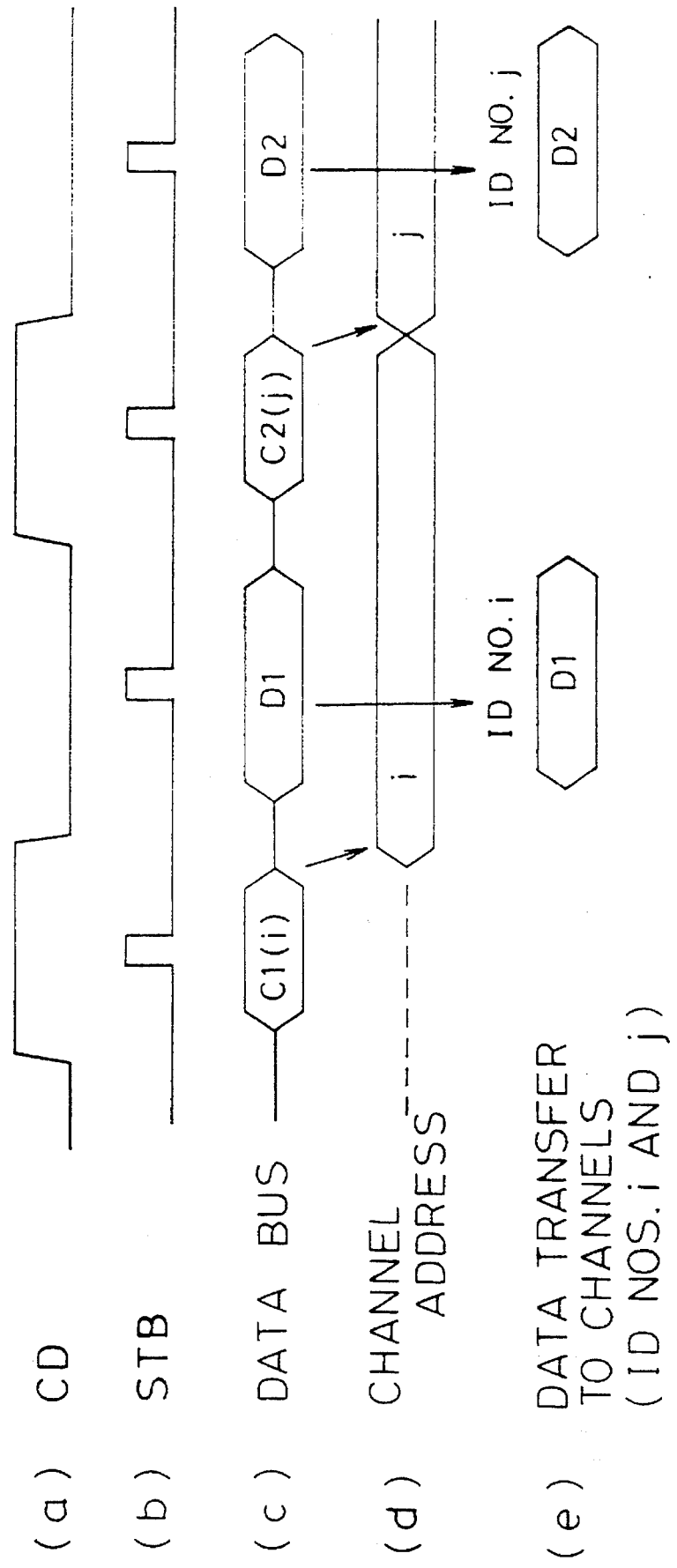
FIG. 3 is a timing diagram depicting a random data transfer from a processor element to plural data transfer channels in the first example.
Figure 4:
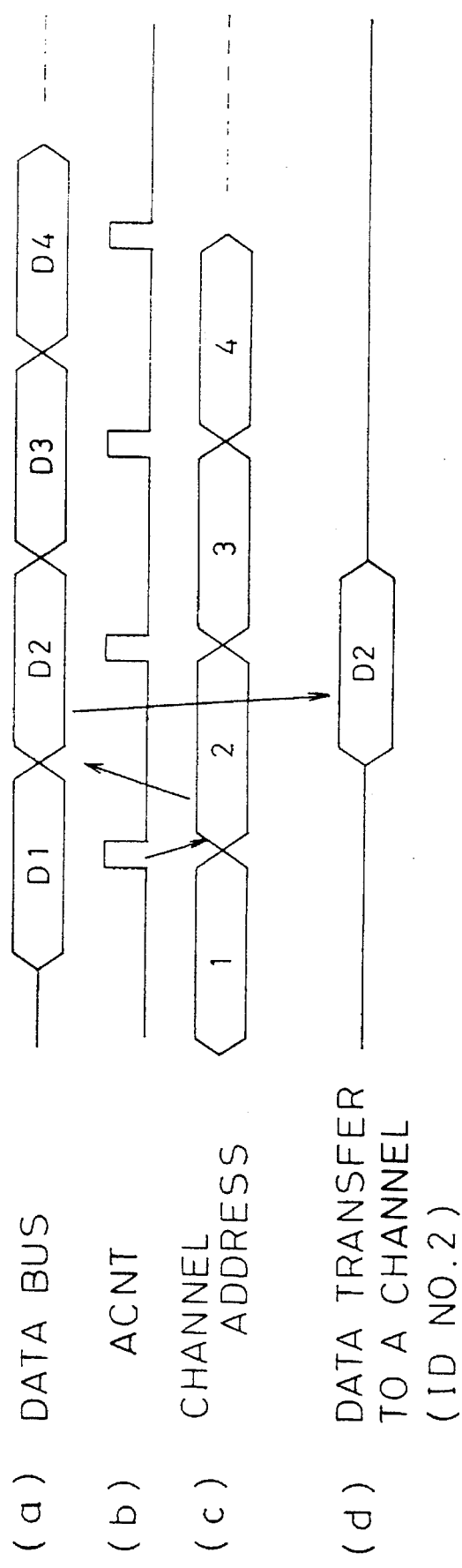
FIG. 4 is a timing diagram depicting a sequential data transfer in a mode from a processor element to plural data transfer channels in the first example.

FIG. 3 is a timing diagram depicting a random data transfer from the processor element 10 to the data transfer channels 20. The data transfer control circuit 13 sends out a command and data onto the data bus 40 sequentially. As each command or piece of data is sent, the data transfer control circuit places a STB (data strobe pulse) onto the control bus 50. When a command is placed onto the data bus 40, CD is set at a "HIGH" level, whereas, when data from the memory 12 is placed on the data bus 40, CD is set at a "LOW" level. In this way, a command and data are distinguishable from each other. In each data transfer channel 20, when the I/O control circuit 82 receives a command, address information contained in the received command is sent to the address counter 33. As it is shown in an example of FIG. 3, when the I/O control circuit 32 receives a first command C1(i) carrying address number i, the channel address held at the address counter 33 is set to i. When the circuit 32 receives a second command C2(j) carrying address number j, the channel address held at the counter 33 is set to j. If in all the data transfer channels 20 the channel addresses held by the address counters 33 are set by C1(i) to all i's, the occurrence that the identification number and the channel address coincide is detected only by the comparison circuit 34 in the data transfer channel 20-IDi. This causes first data D1 sent after C1(i) on the data bus 40 to be taken into the data transfer buffer 21 of the data transfer channel 20-IDi. If in all the data transfer channels 20 the channel addresses held by the address counters 33 are set by C2(j) to all j's, this causes second data D2 sent after C2(j) to be taken into the data transfer buffer 21 of the data transfer channel 20-IDj. As seen from the above, a similar operation to that of a conventional data transfer with a header placed at the head of each item of data is achievable if necessary. FIG. 4 is a timing diagram depicting a sequential data transfer in a mode in which data is transferred sequentially from the processor element 10 to each data transfer buffer 21 in the order in which the N data transfer channels 20 are arranged. After setting the channel addresses held by the address counters 33 of all the data transfer channels 20 to all 1's as shown in FIG. 3, the data transfer control circuit 13 sends out ACNT onto the control bus 50 each time it sends out an item of data onto the data bus 40. In each data transfer channel 20, the channel address held by the address counter 33 is incremented by one each time the I/O control circuit 32 receives ACNT. As a result, an item of data D2 on the data bus 40 is taken into the data transfer buffer 21 of the data transfer channel 20-ID2 at the time when the channel address becomes 2, as shown in FIG. 4. The operation of the remaining data transfer channels is the same as the above, and the destination of data will be updated sequentially in the order in which the data transfer channels 20 are arranged.

Figure 5:
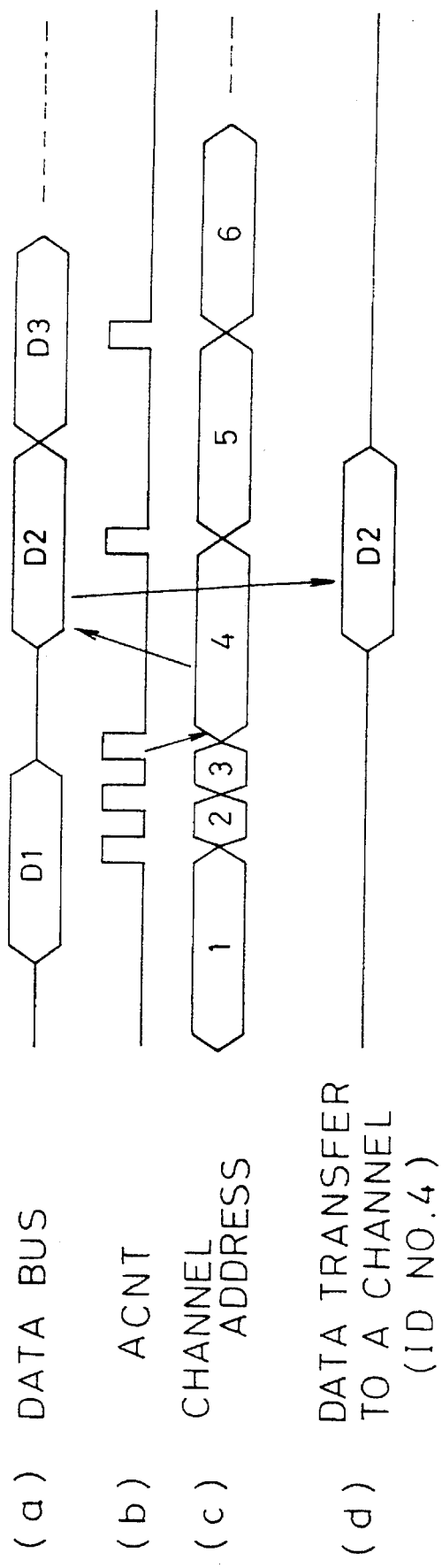
FIG. 5 is a timing diagram depicting a sequential data transfer in another mode from a processor element to plural data transfer channels in the first example.

FIG. 5 is a timing diagram depicting a sequential data transfer in another mode. Here, data is first transferred to the data transfer channel 20-ID1. Then, the data transfer channels 20-ID2,3 are skipped, and data is transferred to the data transfer channel 20-ID4

After setting the channel addresses held in the address counters 33 of all the data transfer channels 20 to all 1's, the data transfer control circuit 13 sends out D1 onto the data bus 40. This D1 is taken into the data transfer buffer 21 of the data transfer channel 20-ID1. The data transfer control circuit 13 then sends out three ACNT's in series onto the control bus 50. This causes the channel addresses held by the address counters 33 of all the data transfer channels 20 to be updated to all 4's, and the data transfer channel 20-ID4, therefore, becomes a new destination of data. At this state, D2 is sent out onto the data bus 40, as illustrated in FIG. 5. This D2 is then taken into the data transfer buffer 21 of the data transfer channel 20-ID4. The operation for transfer of third data D3 and all subsequent data is the same as FIG. 4.

Figure 6:
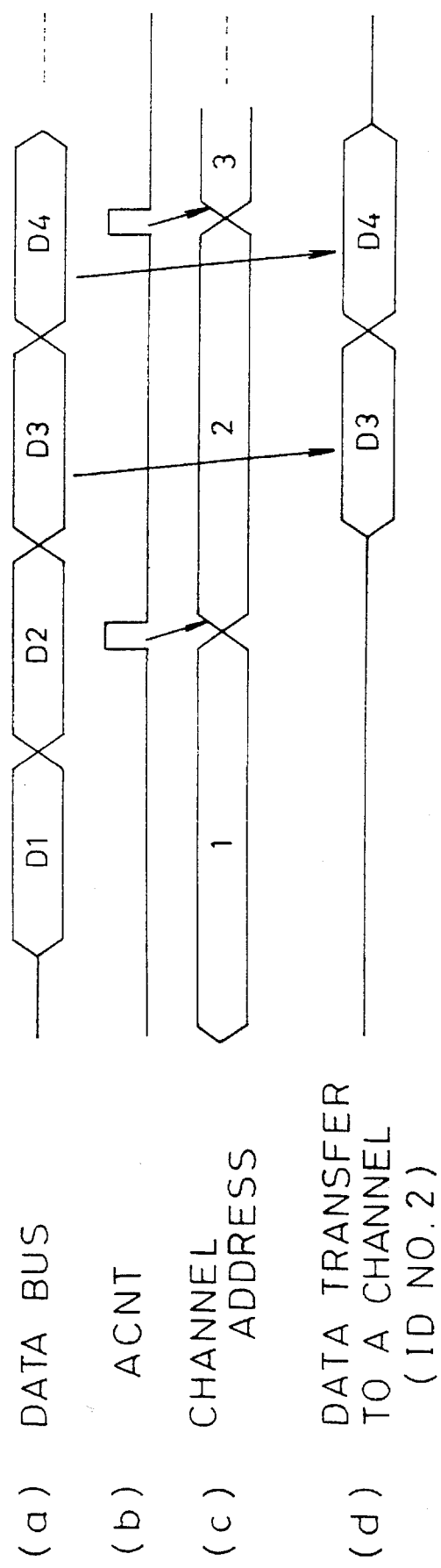
FIG. 6 is a timing diagram depicting a sequential data transfer in still another mode from a processor element to plural data transfer channels in the first example.

FIG. 6 is a timing diagram depicting a data transfer in which data is transferred from the processor element 10 to each data transfer buffer 21 two items at a time in the order in which the N data transfer channels 20 are arranged. After setting the channel addresses held by the address counters 33 of all the data transfer channels 20 to all 1's, the data transfer control circuit 13 continuously sends out D1 and D2 along with STB (not shown). These D1 and D2 are sequentially taken into the data transfer buffer 21 in the data transfer channel 20-ID1. The data transfer control circuit 13 then sends out one ACNT onto the control bus 50 so as to update the channel addresses held by the address counters 33 of all the data transfer channels 20 to all 2's. The destination of data is now changed to the data transfer channel 20-ID2, as a result of which D3 and D4 are sequentially taken into the data transfer buffer 21 in the data transfer channel 20-ID2. After this, by repetition of the same operation as described above, D5,D6, and D7,D8, and so on are transferred to the remaining data transfer buffers. The operation of data transfer of three or more items of data to each data transfer buffer 21 may be carried out in the same way.

Figure 7:
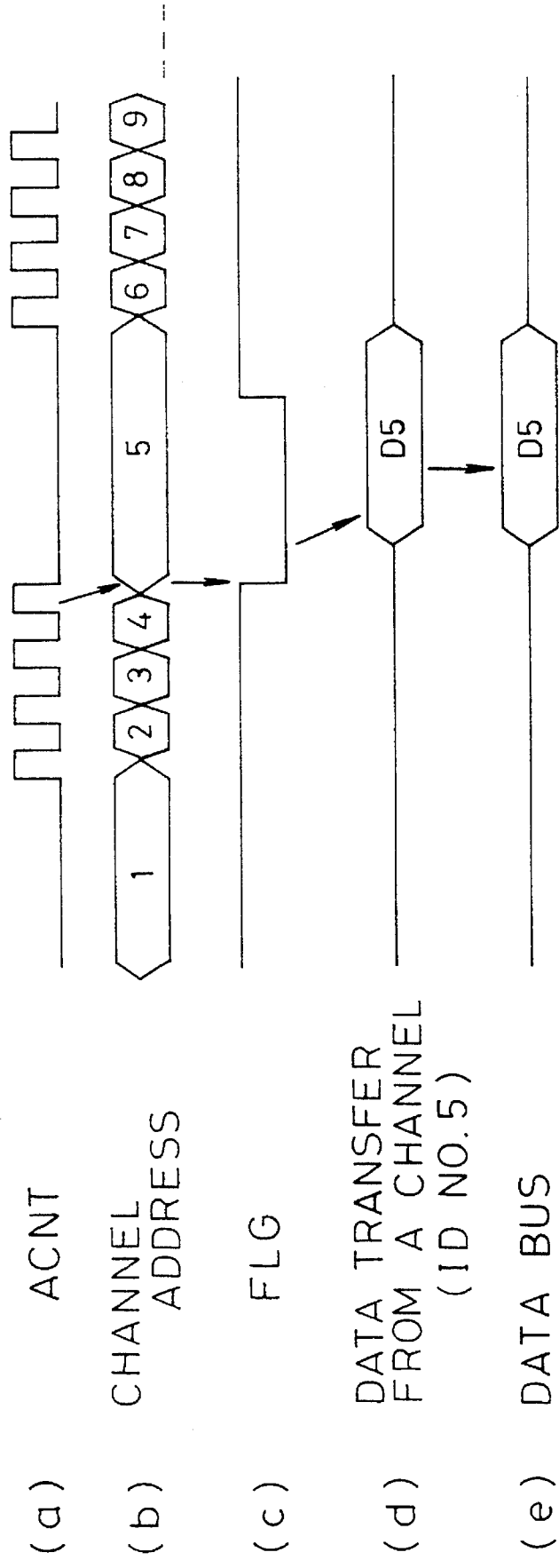
FIG. 7 is a timing diagram depicting a data transfer from one data transfer channel to a processor element in the first example.

FIG. 7 is a timing diagram depicting a data transfer in which data is transferred from the data transfer channel 20 towards the processor element 10. The flag control circuit 83 in the I/O control circuit 32 has a function of lowering the logical level of FLG down to a "LOW" level on the condition that the data transfer buffer 21 holds data to be transferred to the processor element 10 when the comparison circuit 34 indicates that the identification number held by the identification number register 31 is the same as the channel address held by the address counter 33. After setting the channel addresses held by the address counters 33 of all the data transfer channels 20 to all 1's, the data transfer control circuit 13, while checking whether or not the data transfer channel 20 has returned FLG at a "LOW" level, sends out one ACNT at a time in order to sequentially scan the N data transfer channels 20. In an example of FIG. 7, the data transfer channel 20-ID5 is holding data to be transferred to the processor element 10 so that FLG becomes "LOW" at the time when each channel address is updated to a 5. When receiving FLG at a "LOW" level, the data transfer control circuit 13 fetches, via the data bus 40, data D1 from the data transfer buffer 21 of the data transfer channel 20-ID5 which currently is being selected as the destination of data, and stores the fetched data in the memory 12.

In accordance with the present example, it is possible to realize a sequential data transfer without depending upon an address bus or an header (FIG. 4). Accordingly, the reduction of the number of interconnecting wires and data transfer at high speed are achievable at the same time. Further, it is possible to skip a particular data destination in the way described above. Furthermore, it is possible to achieve the transfer and receipt of plural items of data to and from the same data transfer channel. Additionally, it is possible to randomly select the destination of data from among the N data transfer channels 20 through the channel address setting by a command. If an up/down counter is employed instead of the address counter 33, this makes it possible to select a data destination in descending or ascending order in which the N data transfer channels 20 are arranged.

EMBODIMENT II

Figure 8:
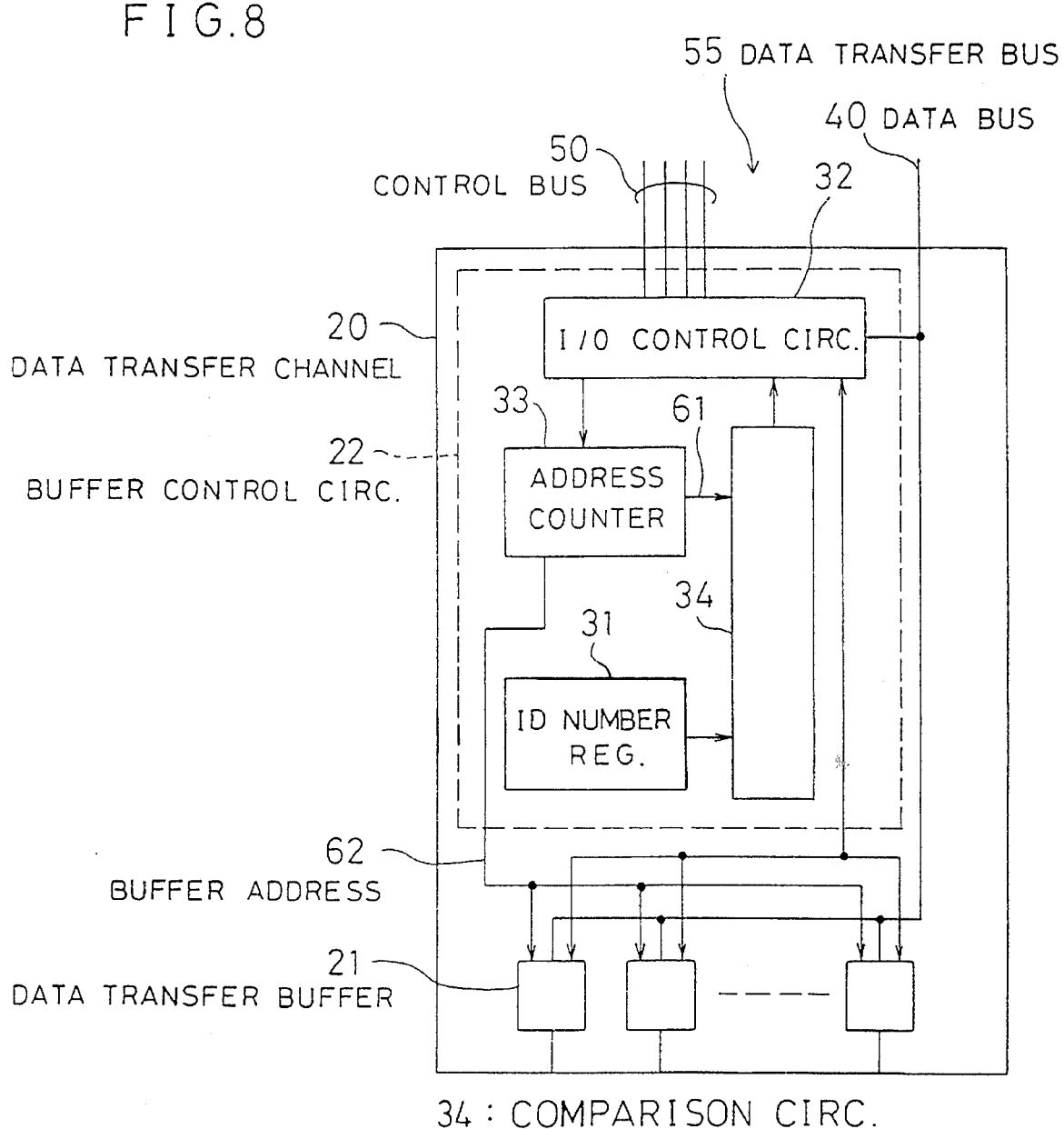
FIG. 8 is a block diagram showing one data transfer channel in a data transfer unit of a second example of the present invention.
Figure 9:
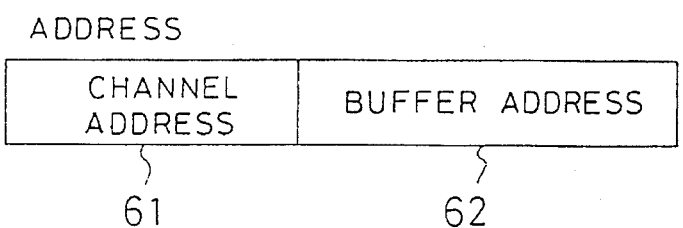
FIG. 9 shows an address field in the second example.

FIG. 8 is a block diagram showing the organization of a data transfer channel 20 in a data transfer unit in accordance with a second embodiment. As shown in the figure, each data transfer channel 20 contains a plurality of data transfer buffers 21. In accordance with the provision of the plural buffers 21, the address counter 33 holds a composite address whose high-order portion is a channel address 61 used to select among the data transfer channels and whose low-order portion, on the other hand, is a buffer address 62 used to select one of the data transfer buffers 21 in the same block. Apart from the above, the present embodiment is identical in configuration to the first example.

In the present embodiment, the channel address 61 is updated in the address counter 33 at the time when a carry occurs to the buffer address 62 in response to ACNT received. In other words, until such time as all the data transfer buffers 21 in one data transfer channel 20 have been selected sequentially, another data transfer channel 20 that is assigned a next identification number is not selected.

EMBODIMENT III

A data transfer unit of a third embodiment is described by reference to FIGS. 10 to 14.

Figure 10:
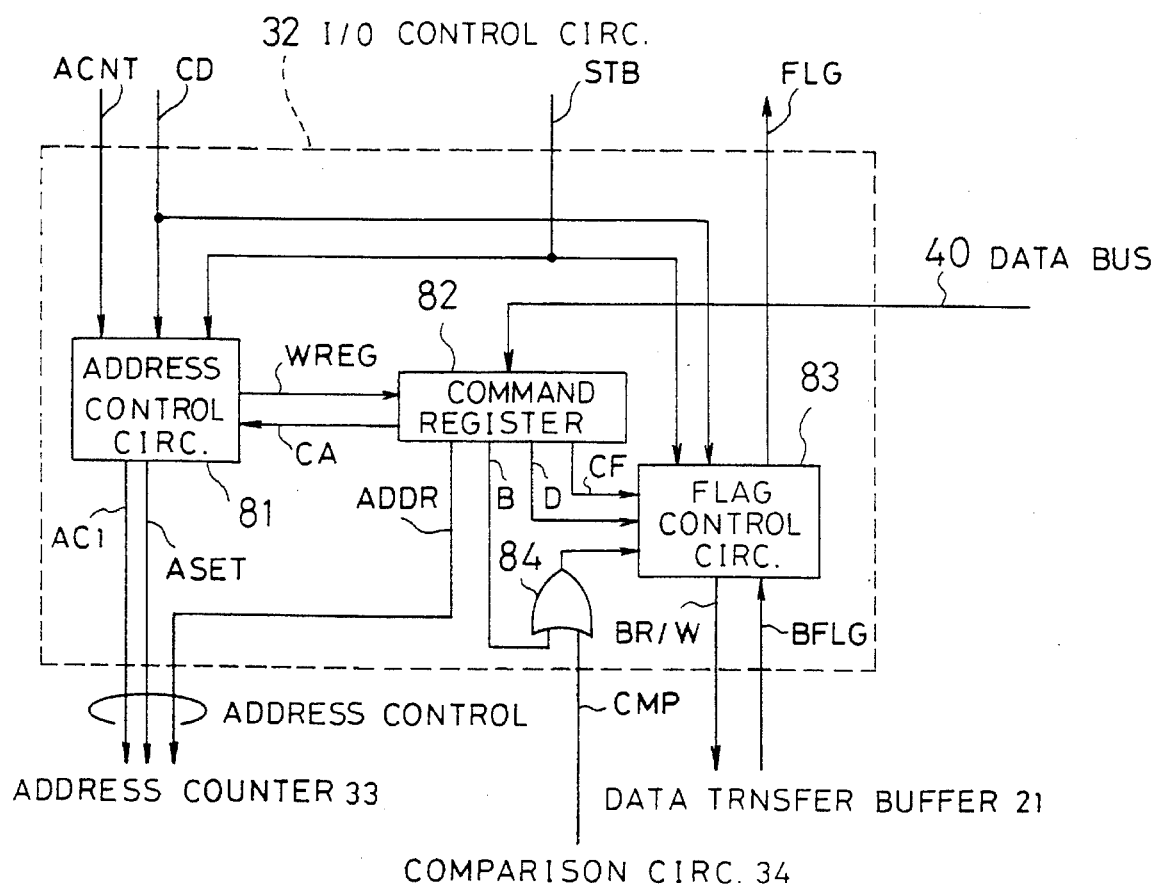
FIG. 10 is a block diagram showing an input/output control circuit provided in one data transfer channel of a data transfer unit of a third example of the present invention.
Figure 11:
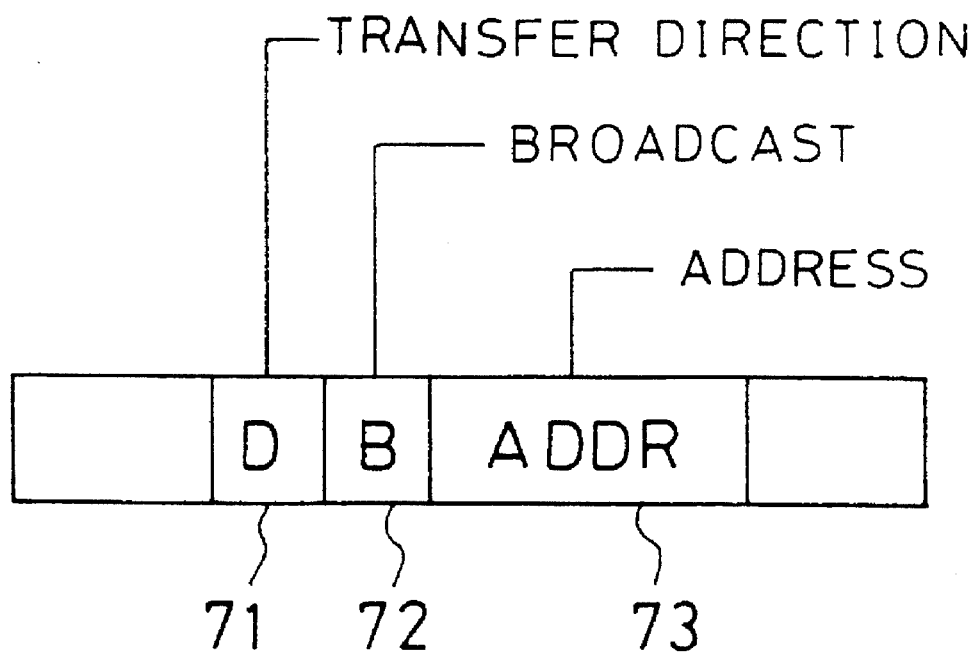
FIG. 11 shows a command register field in FIG. 10.

The I/O control circuit 33 of the third embodiment contains an OR gate 84 in addition to the address control circuit 81, the command register 82, and the flag control circuit 83 (FIG. 10). As shown in FIG. 11, command register 82, used to hold command transmitted via the data bus 40, has a field 71 for data transfer direction (D), a field 72 for broadcast (B), and a field 73 for address (ADDR). The data transfer direction specification D is a parameter used to determine data transfer direction viewed from the processor element 10. The OR gate 84 feeds the flag control circuit 83 with a signal representing the OR of the broadcast specification B from the command register 82 and the comparison result (CMP) from the comparison circuit 34. Information of the address ADDR is fed to the address counter 33 to set the channel address.

Figure 12:
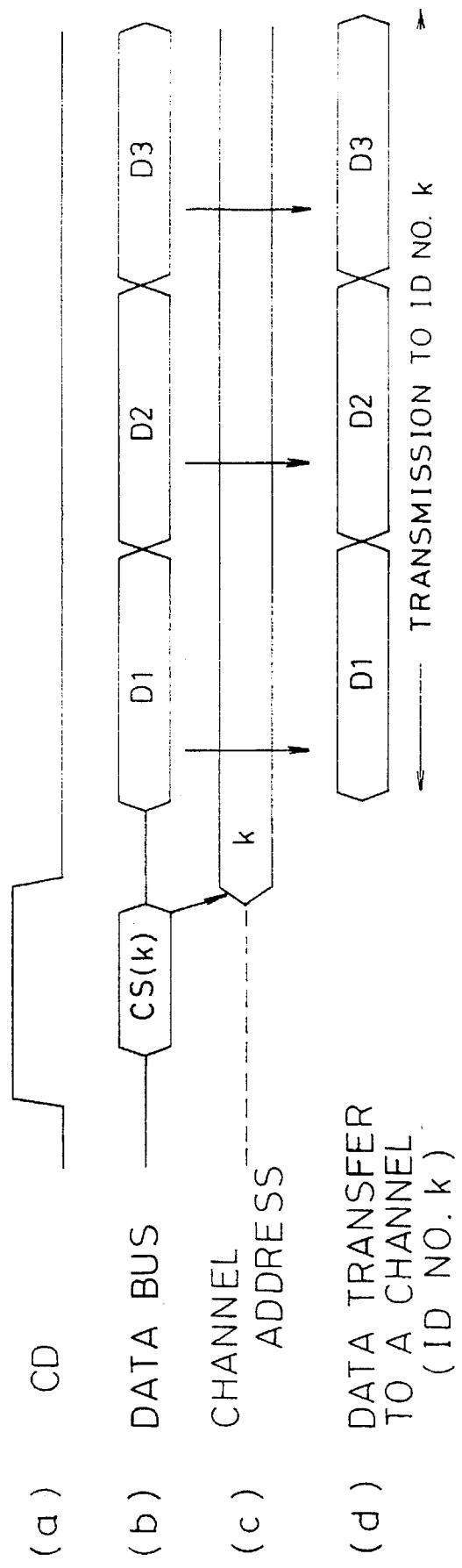
FIG. 12 is a timing diagram depicting a data transfer from a processor element to one data transfer channel in the third example.
Figure 13:
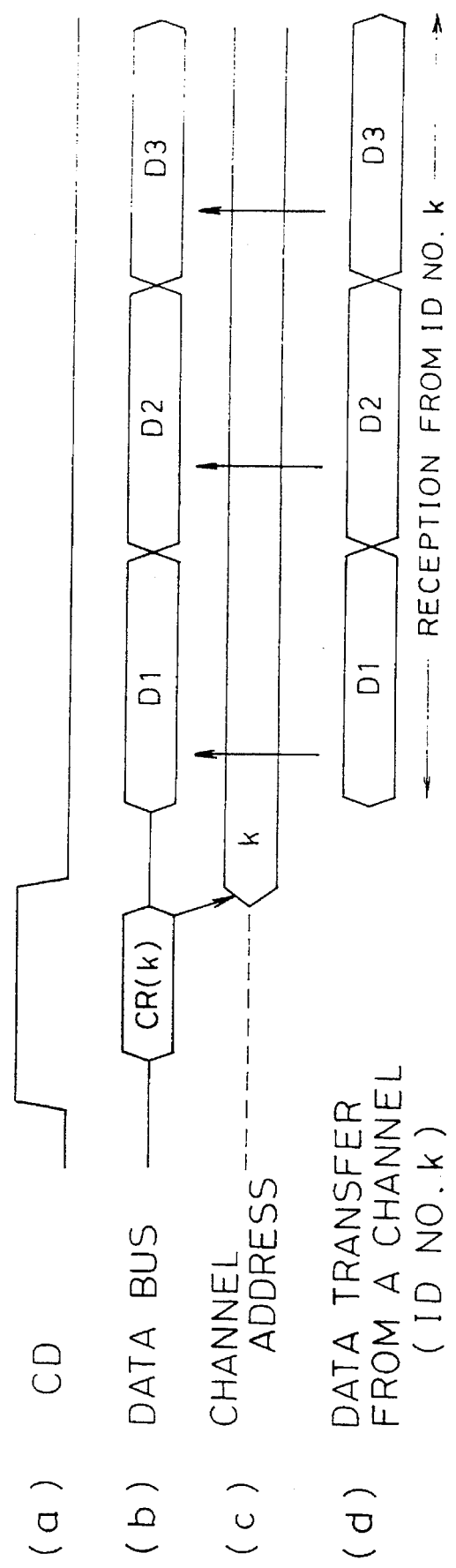
FIG. 13 is a timing diagram depicting a data transfer from one data transfer channel to a processor element in the third example.
Figure 14:
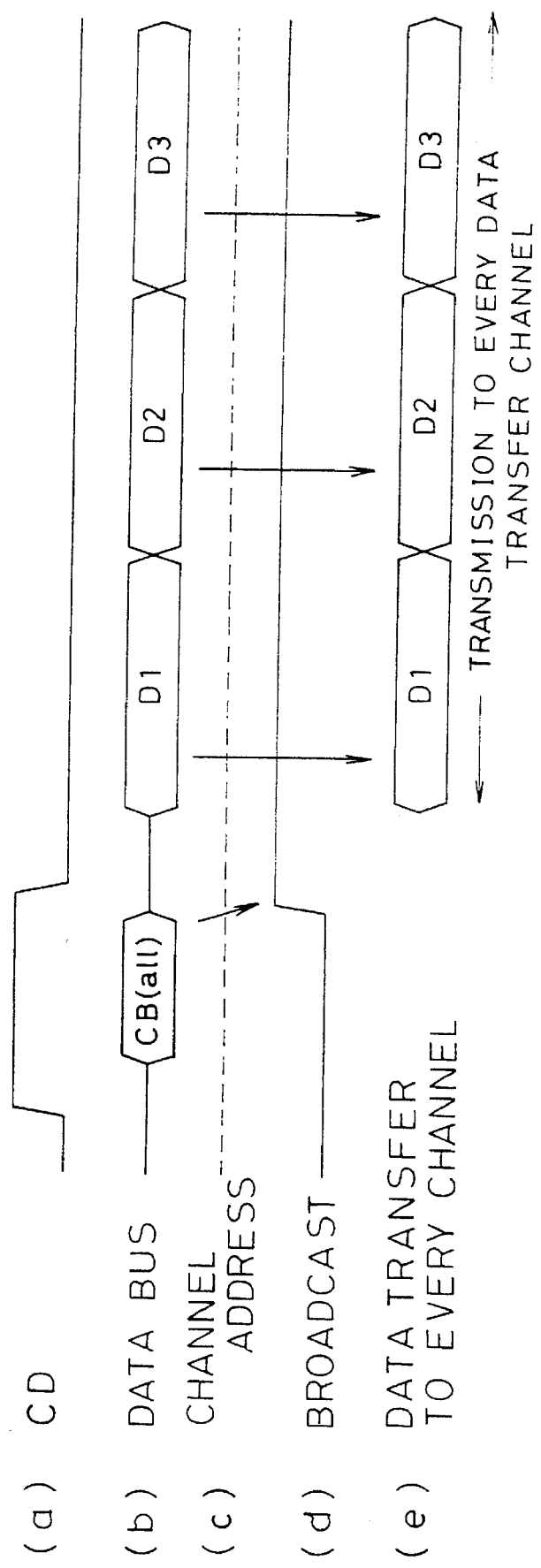
FIG. 14 is a timing diagram depicting a data broadcasting from a processor element to all data transfer channels in the third example.

Now referring to FIGS. 12 to 14, the operations of the above-described data transfer unit in various modes are described. In the same way as in the first embodiment, each identification number register is set prior to the start of a data transfer. Further, a command, which is mutually fed by the data transfer control circuit 13 to the plural data transfer channels 20 via the data bus 40, is set to each command register 82.

The operation of a transfer of data from the processor element 10 to the data transfer channel 20-IDk is described by reference to FIG. 12. The data transfer control circuit 13 in the processor element 10, by means of a sending command CS(k), sets the data transfer:direction specification D to a "sending" from the processor element 10, the broadcast specification B to "no", and the address ADDR to k. As a result, the channel addresses held by the address counters 33 of all the data transfer channels 20 are set to all k's, and D1, D2, and D3 sent after CS(k) on the data bus 40 are sequentially taken into the data transfer buffer 21 of the data transfer channel 20-IDk. Then, the application of ACNT onto the control bus 50 updates the destination of data to the data transfer channel 20-ID(k +1), then to the data transfer channel 20-ID(k +2), and so on, which is the same as in the first embodiment.

A data transfer from the data transfer channel 20-IDk to the processor element 10 is described with reference to FIG. 13. The data transfer control circuit 13 in the processor element 10, by means of a receiving command CR(k), sets the data transfer direction specification D to a "receiving" by the processor element 10, the broadcast specification B to "no", and the address ADDR to k. As a result, the channel addresses held by the address counters 33 of all the data transfer channels 20 are set to all k's, and thus D1, D2, and D3 fed onto the data bus 40 from the data transfer buffer 21 of the data transfer channel 20-IDk are sequentially taken into the data transfer control circuit 13.

A data broadcast from the processor element 10 to all the data transfer channels 20 is described by reference to FIG. 14. The data transfer control circuit 13 in the processor element 10, by means of a broadcast command CB(all), sets the data transfer direction specification D in the command register 82 to a "sending" from the processor element 10, and the broadcast specification B to "yes". The setting of the address ADDR to the command register 82 can be random. As a result, in each data transfer channel 20, the output of the OR gate 84 becomes active regardless of the output of the comparison circuit 34, and D1, D2, and D3 sent after CB(all) on the data bus 40 are sequentially taken into the data transfer buffers 21 of all the data transfer channels 20 as broadcast data.

The foregoing three types of data transfer modes (i.e. the individual sending from a processor element, the receiving by a processor element, and the broadcasting) can be switched using the data transfer control circuit 13, more specifically, such switching is done when the data transfer control circuit 13 sets the logical level of CD (command data signal) to 37 0HIGH" and sends out a command required onto the data bus 40. Since the command fed onto the data bus 40 is set to the command registers 82 of all the data transfer channels 20, this allows the data transfer to continue in a switched mode defined by the command thus set. By resetting each command register 82 to initialize the internal state of each data transfer channel 20, it is possible to allow a data transfer channel in which a malfunction has occurred to return to its normal state. Further, if commands are introduced in order to read the state of each data transfer channel 20, this makes it possible for the processor element 10 to decide in what state a data transfer channel fails to work normally.

In accordance with this example, because of the provision of the command register 82 for holding a command from the processor element 10, it is possible to send out a command as required. This eliminates an unnecessary transfer of address information, thus leading to data transfer at a high rate. Additionally, the operation of broadcasting is selectable. Further, since-usual data transfer continues in one direction only, this means that once a certain data transfer direction is set the change in transfer direction will not be required for a while. Thus, sequential, high-speed data transfer is achievable.

EMBODIMENT IV

A data transfer unit of a fourth embodiment is described by reference to FIGS. 15 to 17.

Figure 15:
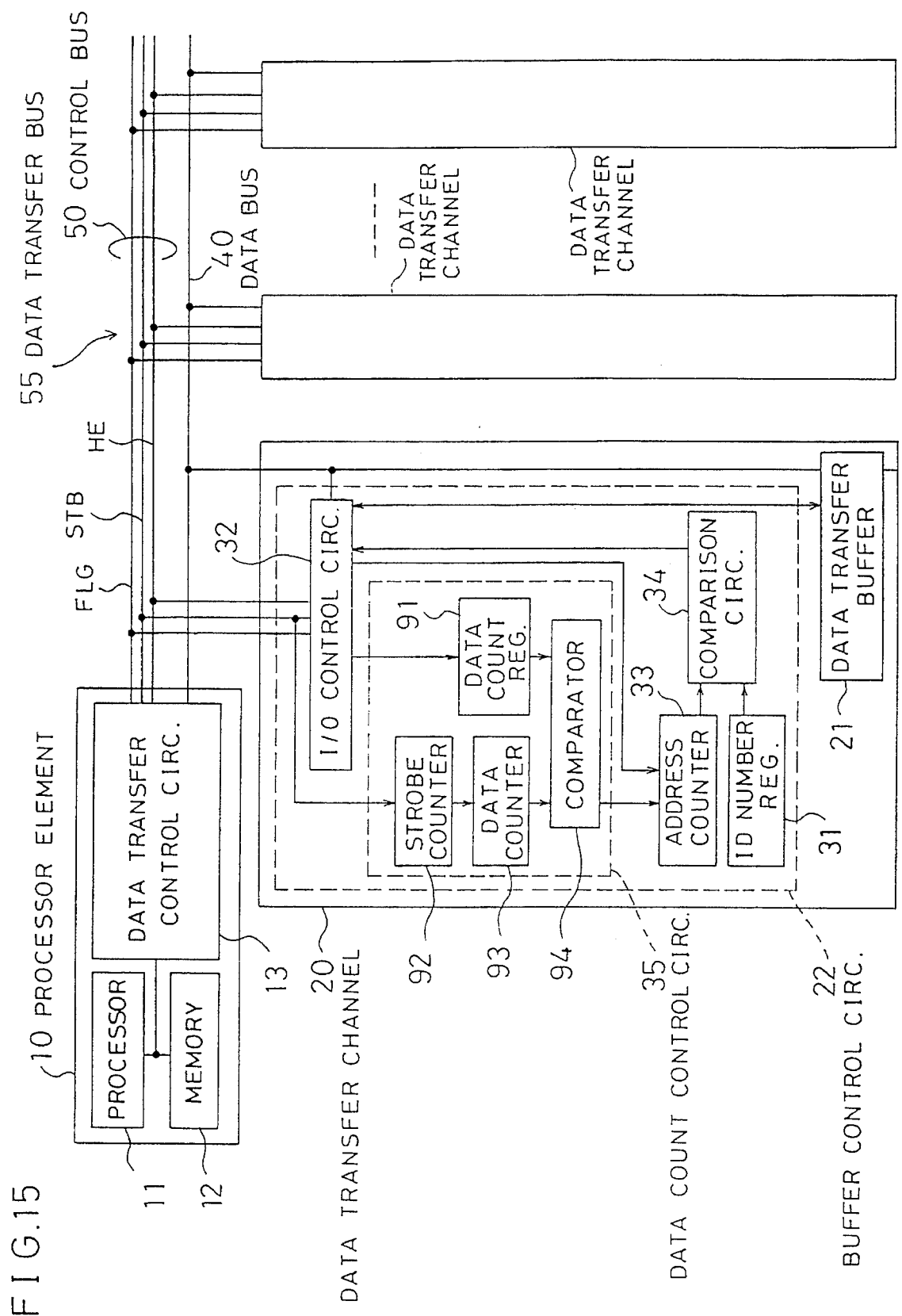
FIG. 15 is a block diagram showing a data transfer unit in accordance with a fourth example of the present invention.

A data transfer unit of the present embodiment, shown in FIG. 15, differs from a data transfer unit of the first embodiment. In this embodiment the control bus 50 and the buffer control circuit 22 are different in structure from the ones in the first embodiment. The data transfer control circuit 13 sends out a data strobe pulse (STB) and an operation mode switching signal HE (i.e. header enable signal) onto the control bus 50. Each data transfer channel 20 returns FLG to the data transfer control circuit 13. The buffer control circuit 22 of the present embodiment has a structure with a data count control circuit 35 located between the I/O control circuit 32 and the address counter 33. This data count control circuit 35 contains a data count register 91, a strobe counter 92, a data counter 93, and a comparator 94. The data transfer control circuit 13, meanwhile, sends onto the data bus 40 both a header, used to internally set each data transfer channel 20, and data being transferred. Since the number of signal lines in the data bus 40 is limited, a single header is divided in three sub-headers and one item of data is divided into four pieces of sub-data. A data strobe pulse (STB) is placed onto the control bus 50 each time a sub-header and sub-data are sent out. In agreement with the number of pieces of sub-data as a result of data division, the strobe counter 92 is a quaternary binary counter. With reference to FIGS. 16 and 17, two different operations of the above-described data transfer unit according to HE are explained. Like the first embodiment, each identification number register 31 is set prior to the start of a data transfer.

Figure 16:
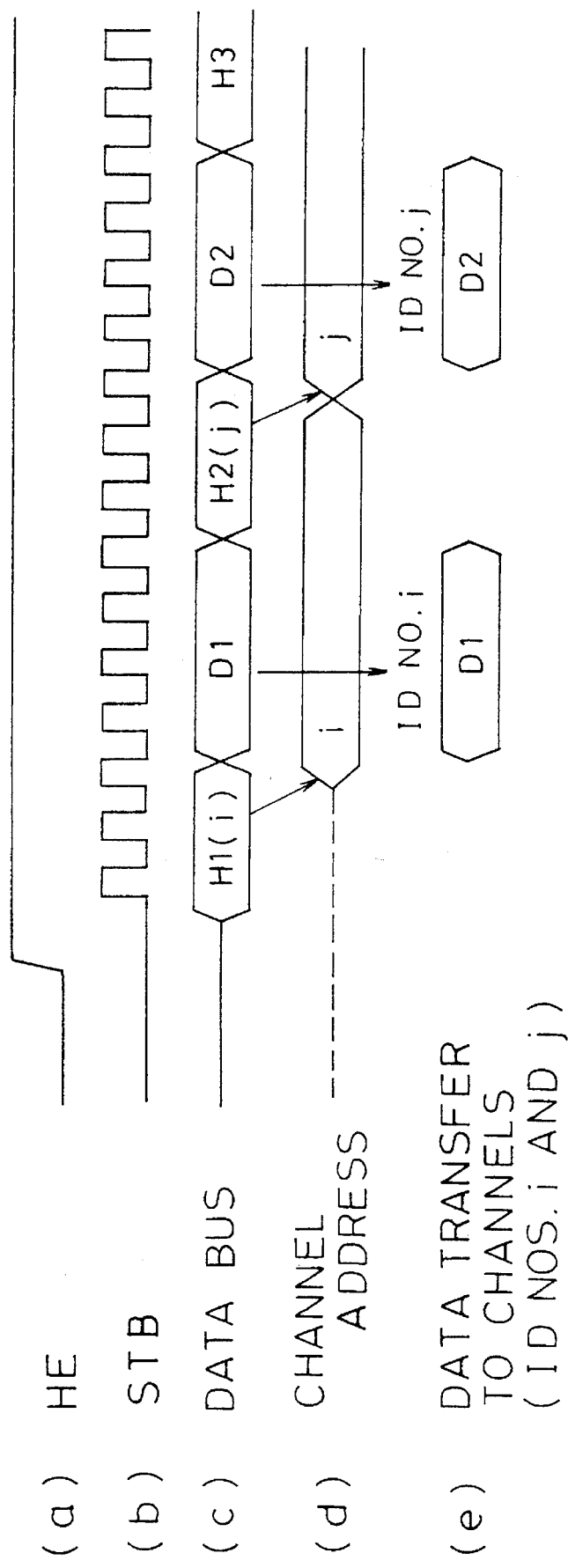
FIG. 16 is a timing diagram depicting a random data transfer from a processor element to plural data transfer channels in the forth example.

FIG. 16 is a timing diagram depicting a random data transfer from the processor element 10 to the plural data transfer channels 20. The data transfer control circuit 13 in the processor element 10 keeps HE over the control bus 50 at a "HIGH" level. Further, the data transfer control circuit 13 places onto the data bus 40 a first header H1(i) including address number i and information on address count while on the other hand it sends out onto the control bus 50 three STB's in series. In each data transfer channel 20, when H1(i) is given to the I/O control circuit 32, the address number i and the data count information are set to the address counter 33 as a channel address and to the data count register 91 respectively. At the same time, both the value held by the strobe counter 92 and the value held by the data counter 93 are reset to 0's. In an example as shown in FIG. 16, a 1 is set to the data counter register 91.

When the channel addresses held by the address counters 33 of all the data transfer channels 20 are set by H1(i) to all i's, fact that the identification number and the channel address coincide is detected only by the comparison circuit 34 in the data transfer channel 20-IDi. This causes D1 sent after H1(i) on the data bus 40 to be taken into the data transfer buffer 21 of the data transfer channel 20-IDi, at which time four STB's are required since D1 has been divided into four pieces. Put another way, the internal integer number held by the strobe counter 92 is incremented each time it receives one STB. Upon receiving a fourth STB, the strobe counter 92 delivers one internal count pulse to the data counter 93, as a result of which the value held by the data counter 93 is updated to a 1. At this point in time, the value held by the data counter 93 and the data count held by the data count register 91 coincide. This causes the comparator 94 to give off a count-up pulse to the address counter 33. The channel address held by the address counter 33, then, is updated to (i+1). When, in this way, the address counter's 33 channel address is updated to (i+1), the data transfer to the data transfer buffer 21 of the data transfer channel 20-IDi is completed.

Meanwhile, in the data transfer channel 20-ID(i+1), the channel address held by the address counter 33, also is updated to (i+1). This means that the data transfer channel 20-ID(i+1) is ready for receiving data. However, there is a protocol, providing that each data transfer channel 20 must carry out the aforesaid leading operation including the receiving of a header and the setting of a channel address just before receiving data, as long as HE is held at a "HIGH" level. In other words, in the data transfer channel 20-ID(i+2), the output of the comparison circuit 34 is made invalid by the I/O control circuit 32. In an example shown in FIG. 16, it is this moment that a second header H2(j) including address number j is placed onto the data bus 40, whereby the data transfer channel 20-IDj becomes the next destination of D2 after H2(j).

As described above, as long as HE is held at a "HIGH" level, the channel address setting operation and the data transfer operation will alternate under the I/O control circuit's 32 control. As a result, a similar operation to that by a conventional data transfer using a header is achievable.

Figure 17:
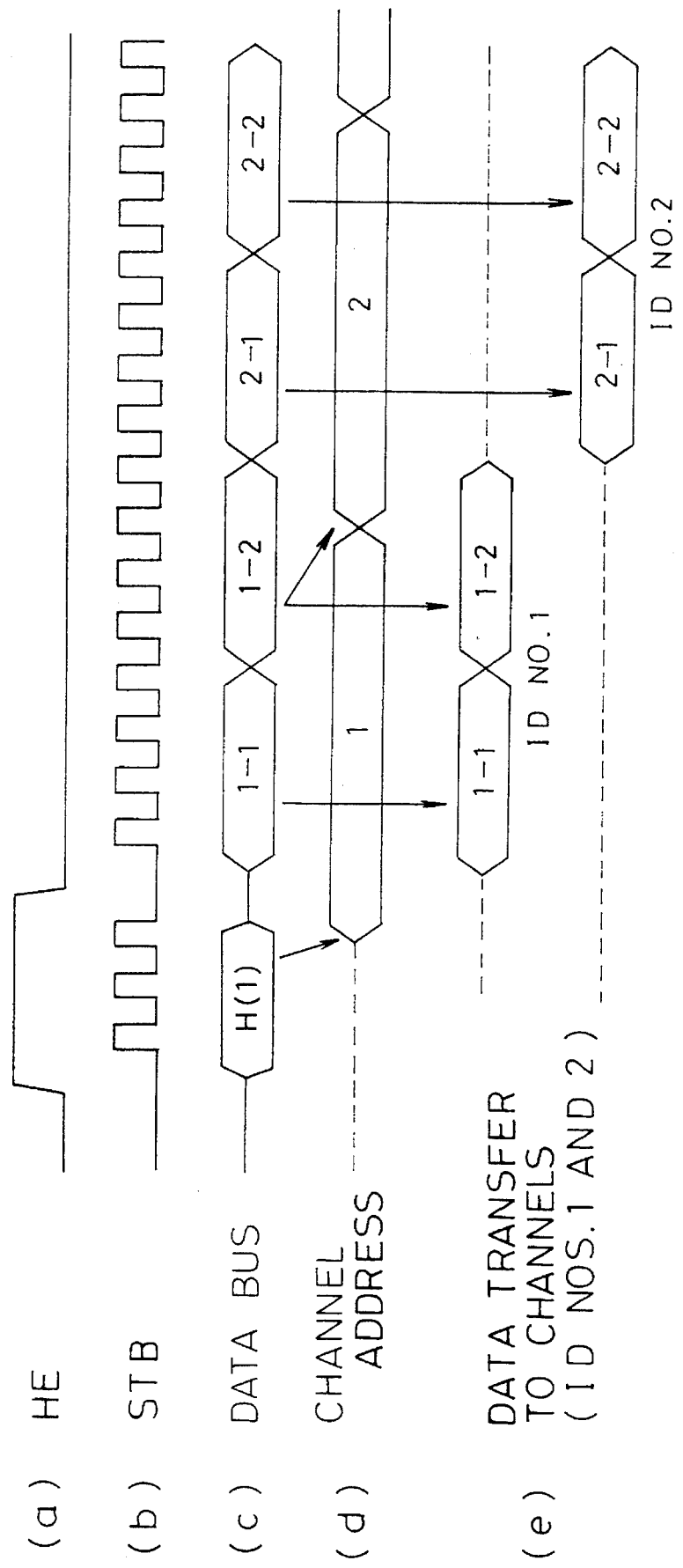
FIG. 17 is a timing diagram depicting a sequential data transfer from a processor element to plural data transfer channels in the fourth example.

FIG. 17 is a timing diagram depicting a sequential data transfer in which two items of data are transferred at a time from the processor element 10 to each data transfer buffer 21 in the order in which the N data transfer channels 20 are arranged. The data transfer control circuit 13 in the processor element 10 sends a header H(1) carrying address number 1 and information-on data count down the data bus 40 and puts three data strobe pulses (STB) in series on the control bus 50 while at the same time keeping HE on the control bus 50 at a "HIGH" level. The I/O control circuits 32 are mutually given H(1) via the data bus 40. Accordingly, in each data transfer channel 20, the address number 1 is set to the address counter 33 as a channel address and the data count information is set to the data count register 91. At the same time, both the value held by the strobe counter 92 and the value held by the data counter 93 are reset to 0's. In an example shown in FIG. 17, a 2 is set to the data count register 91.

Upon both the address counter 33 and the data count register 91 being set, the data transfer control circuit 13 changes the logical level of HE to "LOW", thereafter sequentially sending data down the data bus 40. Each data transfer channel 20 fetches two items of data at a time into its data transfer buffer 21 in the order of arrangement.

During this period, when the channel addresses, held by the address counters 33 of all the data transfer channels 20, are set by H(1) to all 1's, coincidence between the identification number and the channel address is detected only by the comparison circuit 34 in the data transfer channel 20-ID1. As a result, two items of data sent after H(1) on the data bus 40 are taken into the data transfer buffer 21 of the data transfer channel 20-ID1. Since each data is divided in four pieces, eight data strobe pulses (STB) are required for taking them into the buffer 21.

The internal integer number held by the strobe counter 92 is incremented each time it receives one STB. Then, at the time when the forth STB from H(1) is applied to the strobe counter 92, the strobe counter 92 applies one internal count pulse to the data counter 93. As a result, the value held by the data counter 93 is updated to a 1 and the integer number held by the strobe counter 92 is again reset to a 0. At this point in time, the value held by the data counter 93 has not yet reached the data count held by the data count register 91 (i.e. 2). This means that it will not happen at all that the comparator 94 gives a count-up pulse to the address counter 33. The data transfer channel 20-ID1, therefore, keeps receiving data. When four more STB's are given to the strobe counter 92, it gives a next internal count pulse to the data counter 93. As a result, the value-held by the data counter 93 is updated to a 2 and the value held by the strobe counter 92 is again reset to a 0. At this point, the value held by the data counter 93 matches the data count held by the data count register 91, which causes the comparator 94 to give off a count-up pulse to the address counter 33. As a result, the channel address is updated to a 2 and the value held by the data counter 93 is again reset to a 0. When, in this way, the channel address of the address counter 33 is updated to a 2, the data transfer channel 20-ID1 finishes fetching two items of data into its data transfer buffer 21.

In the data transfer channel 20-ID2, meanwhile, the counting of STB is carried out by the strobe counter 92 and by the data counter 93 concurrently with the above in the same way. As a result, immediately the channel address held by the address counter 33 is updated to a 2, and both the value held by the strobe counter 92 and the value held by the data counter 93 are reset to 0's. In each data transfer channel 20, the output of the comparison circuit 34 is validated by the I/O control circuit 32 as long as HE is kept at a "LOW" level. As a result of this, the following two items of data being sent from the data transfer control circuit 13 onto the data bus 40 are taken into the data transfer buffer 21 of the data transfer channel 20-ID2. Hereinafter, by repetition of the like operation, data is taken into each data transfer buffer 21 by two items in the order in which the N data transfer channels 20 are arranged. Since only a one-off header transfer is required at the beginning, this eliminates an unnecessary transfer of information on address and on data count. A high data transfer rate is achievable. Additionally, instead of using the data count register 91, a command register may be employed which further includes a fourth field for holding information on data count, in addition to the fields for the data transfer direction specification D, the broadcast specification B, and the address ADDR in the third embodiment (see FIGS. 10 and 11)

EMBODIMENT V

A fifth embodiment relates to a multiprocessor system. This multiprocessor system is described by reference to FIGS. 18 to 22.

Figure 18:
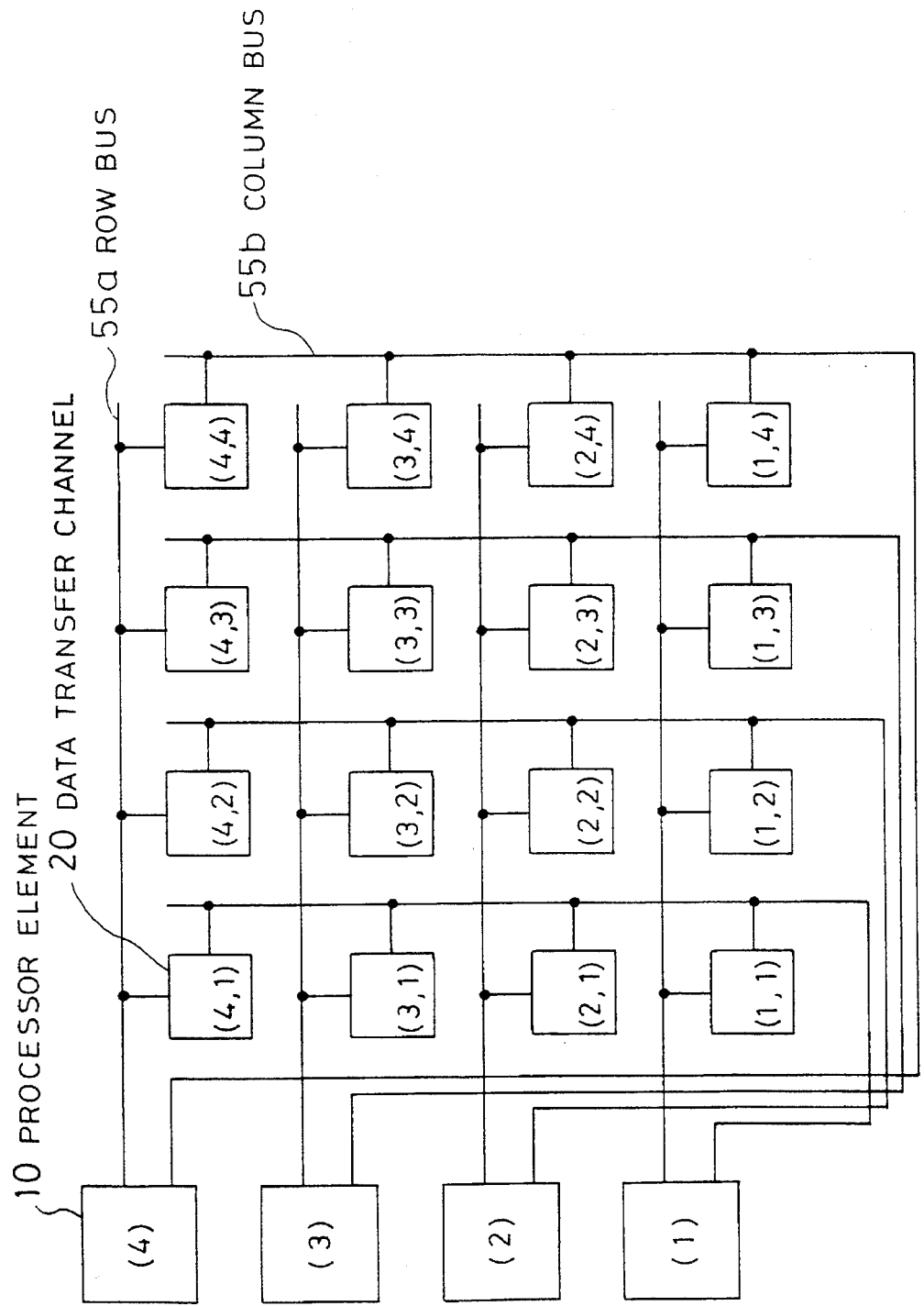
FIG. 18 is a block diagram showing a multiprocessor system in accordance with a fifth example of the present example.

FIG. 18 illustrates this multiprocessor system. The present multiprocessor has N processor elements 10, N-by-N data transfer channels 20 in a matrix arrangement, N sets of row buses 55a, and N sets of column buses 55b. FIG. 18 is an example where N =4. Of the N sets of row buses 55a, the i-th row bus 55a derived from the i-th processor element 10(i) of the N-by-N processor elements 10 is connected to each of N data transfer channels 20-ID(i, 1) to (i, N) together forming the i-th row in the N-by-N matrix, with the number i being from 1 to N. Of the N sets of column buses 55b, the j-th column bus 55b derived from the j-th processor element 10(j) of the N-by-N processor elements 10 is connected to each of N data transfer channels 20-ID(1,j) to (N, j) together forming the j-th column in the N-by-N matrix, with the number j being from 1 to N.

Figure 19:
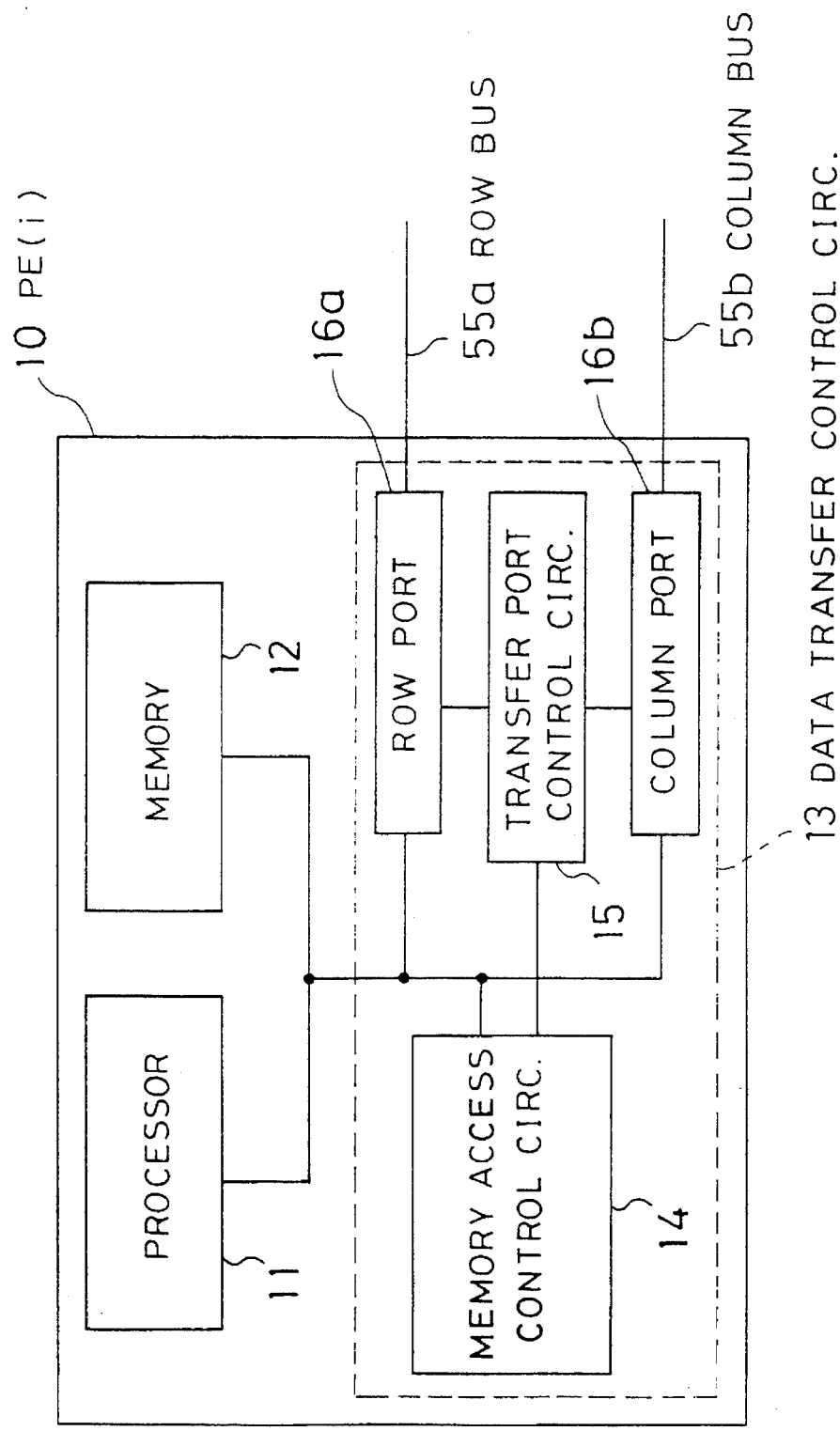
FIG. 19 is a block diagram showing one processor element in FIG. 18.

FIG. 19 shows the internal organization of the i-th processor element 10(i) of the N processor elements 10. In each processor element 10, the processor 11, the memory 12, and the data transfer control circuit 13 are interconnected through an internal bus. The data transfer control circuit 13 has a memory access control circuit 14, a transfer port control circuit 15, a row port 16a, and a column port 16b. Derived from the row port 16a is the row bus 55a, and the column bus 55b is derived from the column port 16b. The memory access control circuit 14 is a circuit which generates a memory address when reading data from the memory 12 and when storing data in the memory 12. The transfer port control circuit 15 is a circuit which controls both the operation of the row port 16a and the operation of the column port 16b to send out data, read out of the memory 12 onto the row bus 55a or onto the column bus 55b, or to transfer data on the bus 55a and data on the bus 55b to the memory 12.

Figure 20:
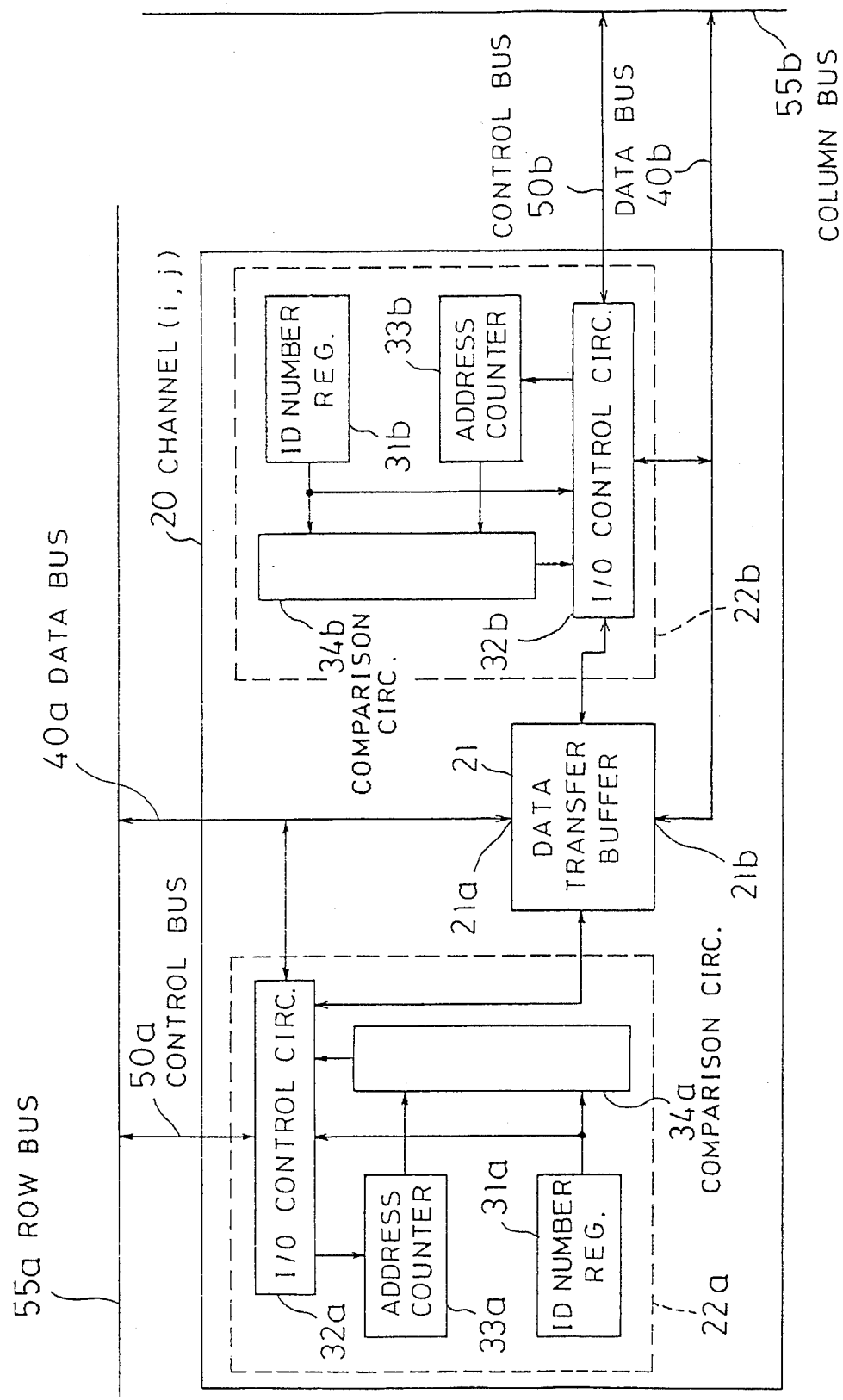
FIG. 20 is a block diagram showing one data transfer channel in FIG. 18.

FIG. 20 is a block diagram showing the internal organization of the data transfer channel 20-ID(i, j) designated by row number i and column number j. This data transfer channel 20-ID(i, j) has a data transfer buffer 21 with a first and a second port 21a and 21b and a first and a second buffer control circuit 22a and 22b both identical in configuration to the one of the firsts embodiment (see FIG. 1), the first buffer control circuit 22a being on the row and the second buffer control circuit 22b being on the column. As detailed in FIG. 20, the row bus 55a is made up of a data bus 40a and a control bus 50a, and the column bus 55b is made up of a data bus 40b and a control bus 50b. The data bus 40a is connected to the first port 21a of the data transfer buffer 21 as well as to the first buffer control circuit 22a. The data bus 40b is connected to the second port 21b of the data transfer buffer 21 as well as to the second buffer control circuit 22b. The control busses 50a and 50b are communication channels through which ACNT, FLG, STB, and CD pass, as in the first example, and are connected to the first and second buffer control circuit 22a and 22b, respectively.

The first buffer control circuit 22a located on the row has an identification number register 31a, an I/O control circuit 32a, an address counter 33a, and a comparison circuit 34a. The identification number register 31a is a storage-location used to hold the column number j of the data transfer channel 20-ID(i, j) as a first identification number thereof. This first identification number j is fed to the comparison circuit 34a, and is fed to the row bus 55a via the I/O control circuit 32a and to the column bus 55b via the data transfer buffer 21.

The second buffer control circuit 22b located on the column has an identification number register 31b, an I/O control circuit 32b, an address counter 33b, and a comparison circuit 34b. The identification number register 31b is a storage location used to hold the row number i of the data transfer channel 20-ID(i, j) as a second identification number thereof. This second identification number i is fed to the comparison circuit 34b, and is fed to the column bus 55b via the I/O control circuit 32b and to the row bus 55a via the data transfer buffer 21.

Figure 21:
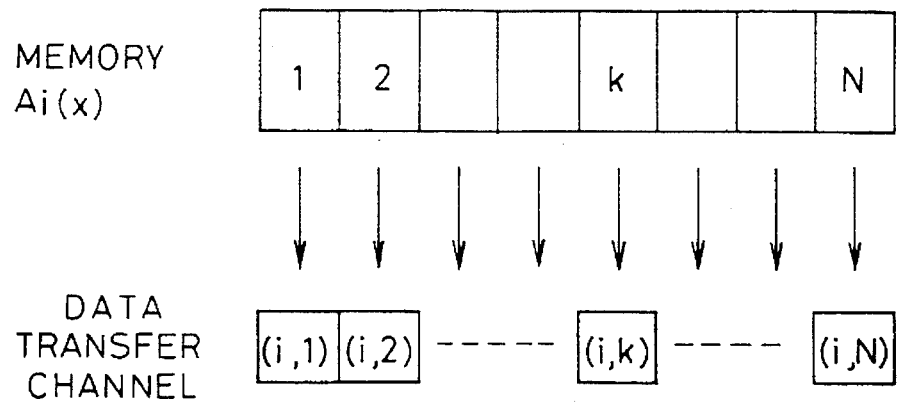
FIG. 21 is an illustration for explaining an array data transfer from one processor element to N data transfer channels in the fifth example.
Figure 22:
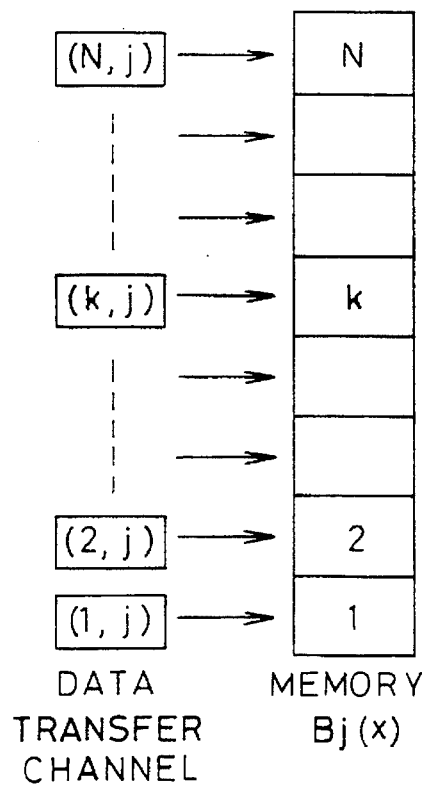
FIG. 22 is an illustration for explaining an array data transfer from N data transfer channels to one processor element in the fifth example.
Figure 23:
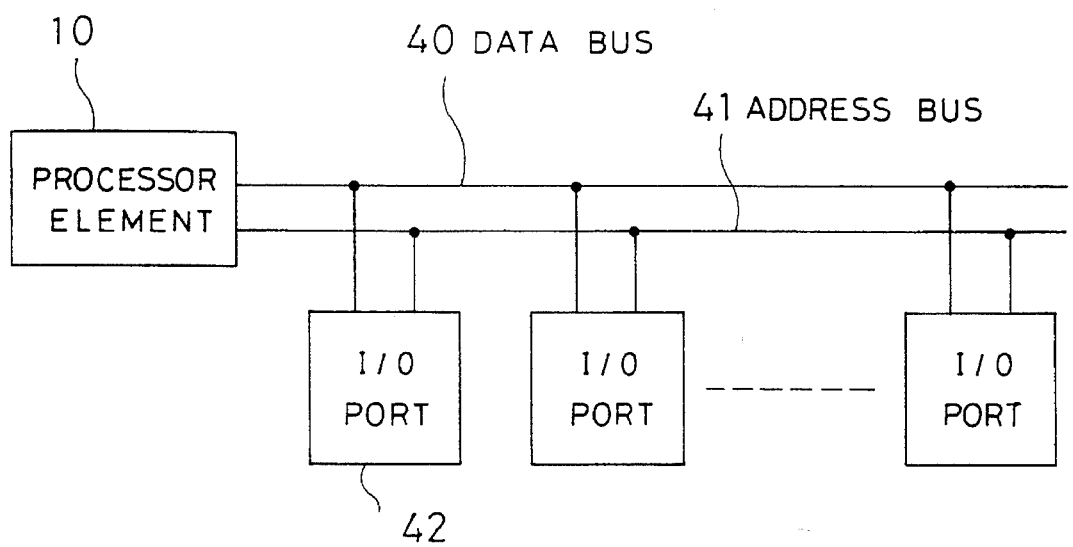
FIG. 23 is a block diagram outlining a conventional data transfer unit which uses an address bus to identify data destinations.
Figure 24:
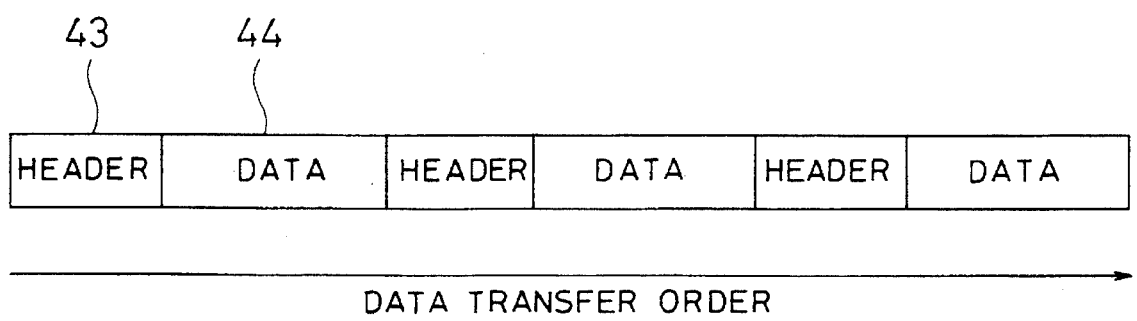
FIG. 24 illustrates how the operation of a conventional data transfer unit in which data destinations are identified by a header placed at the head of each data is timed.

With reference to FIGS. 21 and 22, an array data transfer between each processor in a multiprocessor system of the present embodiment is described.

This array data transfer is described by assuming that the i-th processor element 10(i) of the N processor elements 10 has a data array Ai composed of N elements in the memory 12. As shown in FIG. 21, elements Ai(x) (x =1 to N) in the array Ai are written to the data transfer buffers 21 of the N data transfer channels 20-ID(i, 1) to (i, N) forming the i-th row, respectively, via the i-th row bus 55a. Such writing is executed by a sequential data transfer at high transfer rate using ACNT, which is previously described in the first embodiment (see FIG. 4).

After data, i.e. Ai(x) is written into each data transfer buffer 21 through the first port 21a as describe above, it is read through the second port 21b. As shown in FIG. 22, data, read out from each data transfer buffer 21 in the N data transfer channels 20-ID( i, J ) to (N, j ) forming the j-th column, comes to be recorded, via the j-th column bus 55b, in the memory 12 of the j-th processor element 10(j) as a data array element Bj(x) (x =1 to N). This, too, is done by a sequential data transfer at high speed using ACNT and FLG, as previously described in the first embodiment (see FIG. 7).

A data transfer between two specified processor elements of the N processor elements 10 (for example, a transfer from the m-th processor element(m) to the n-th processor element(n)) is carried out using commands described with reference to FIG. 3, via one of the N-by-N data transfer channels 20, i.e. the data transfer channel 20-ID(m, n)o In the event that data transfer between each processor occurs randomly, the j-th processor element(j), while checking whether or not FLG at a "LOW" level is returned on the j-th column bus 55b (FIG. 7), makes itself stand ready for incoming data by sending out ACNT one by one so as to sequentially scan the N data transfer channels forming the j-th column.

Next, the automatic setting of identification numbers to the processor elements 10 is described. As seen from FIGS. 18 and 20, N data transfer channels forming the i-th row each hold the same row number (i.e. row number i) as second identification numbers. Then, each processor element 10, via the row bus 55a connected to its row port 16a, reads in a row number held by any one of N data transfer channels commonly connected to the row bus 55a as a second identification number, and stores it in the memory 12 as its own identification number. On the other hand, N data transfer channels forming the j-th column each hold the same column number (i.e. column number j) as a first identification number. Each processor element 10, via the column bus 55b connected to its column port 16b, is also capable of reading in a column number held by any one of N data transfer channels commonly connected to the column bus 55b as a first identification number, and of storing it in the memory 12 as its own identification number. To sum up, each processor element 10 makes itself capable of obtaining its own identification number on the basis of information stored within a linking network formed by the data transfer channels 20. Each processor element identification number thus obtained is used to sort parallelized processing or to establish communications between processing divided in parallel.

As seen from FIGS. 18 and 20, N data transfer channels forming the i-th row hold their respective column numbers j ranging from 1 to N as first identification numbers. Then, each processor element 10, via the row bus 55a connected to its row port 16a, sequentially reads column numbers held by all the N data transfer channels commonly connected to the row bus 55a as their first identification numbers, thereafter storing the greatest one of all the column numbers (i.e. a maximum N) as the number of data transfer channels connected to each processor element, in the memory 12. The number of data transfer channels obtained in this way (i.e. the linking network size N) represents the total number of processor elements 10 as well, and is used, together with the foregoing identification number, as a location reference to indicate each processor element's location in a multiprocessor system. Meanwhile, N data transfer channels forming the j-th column hold column numbers i ranging from 1 to N, as their respective second identification numbers. Then, each processor element 10, via the column bus 55b connected to its column port 16b, may sequentially read row numbers held by all the N data transfer channels commonly connected to the column bus 55b as their second identification numbers, and the greatest one of all the row numbers read (i.e. a maximum N ) may be the number of data transfer channels to be stored in the memory 12.

The effect of employing the present example is that sequential data transfer can be accomplished with using neither address buses nor headers. As a result, the number of interconnecting wires required can be reduced while at the same time the transfer of data can be carried out at high transfer rate. This makes it possible for a large-scaled multiprocessor system to be realized in an easier way. Additionally, it is so designed that each processor element 10 obtains on the basis of information stored in a linking network its own identification number and information on the size of a linking network. The automatic setting of identification numbers to processor elements and the acquisition of information on the size of a linking network can be achieved without preparing a specialized program to a host computer and providing extra hardware to each processor element 10.

Further, instead of storing the processor element identification number and the channel count N in the memory 12, they may be stored either in a register in the processor 11 or in a register provided in the data transfer control circuit 13. Furthermore, as shown in the fourth example (FIG. 15), each data transfer channel 20 may update its channel address by means of the count of STB.

The invention claimed is:

1. A data transfer unit in which a data transfer control circuit is connected by a common data bus and by a common control bus to plural data transfer channels each of which has a data transfer buffer used to temporarily store data, each of said data transfer channels comprising:
(a) an identification number register for storing a unique identification number to identify each of said data transfer channels,
(b) an address counter for storing a channel address which is set to allow each data transfer channel to have an identical channel address number and which is updated by a constant value each time said address counter receives an address count pulse from said data transfer control circuit through said control bus, and
(c) a comparison circuit for selecting said data transfer buffer in said data transfer channel as a destination or source of data being transferred between said selected data transfer buffer and said data transfer control circuit through said data bus when the identification number held by said identification number register and the channel address held by said address counter coincide.

2. A data transfer unit as in claim 1, wherein said data transfer channels each further include a command register for receiving a command on said data bus and for storing the received command when said data transfer channel receives from said data transfer control circuit through said control bus a command data signal indicating that said command is placed on said data bus.

3. A data transfer unit as in claim 2, wherein said command register has a field for storing an address, which is a part of said command given from said data transfer control circuit, to be sent as a channel address to said address counter.

4. A data transfer unit as in claim 2, wherein said command register has a field for storing a data transfer direction specification, which is a part of said command given from said data transfer control circuit, to decide a direction of data transfer between said data transfer control circuit and the data transfer buffer.

5. A data transfer unit as in claim 2, wherein:
(a) said command register has a field for storing a broadcast specification which is a part of said command given from said data transfer control circuit, and
(b) each of said data transfer channels further including a broadcast controller for forcing, regardless of what selection is made by said comparison circuit, data sent by said data transfer control circuit onto said data bus to be input to said data transfer buffer according to the broadcast specification in said field of said command register.

6. A data transfer unit as in claim 1, wherein:
(a) said plural data transfer channels each have plural data transfer buffers, and (b) said address counter of each of said data transfer channels has a function of storing a composite address which is set to allow each data transfer channel to have an identical address number and which is updated by a constant value through said control bus, said composite address being composed of said channel address as a high-order portion and of a buffer address, used to select one of said data transfer buffers in said data transfer channel, as a low-order portion.

7. A data transfer unit in which one data transfer control circuit is connected by a common data bus and by a common control bus to plural data transfer channels each of which has a data transfer buffer used to temporarily store data, each of said data transfer channels comprising:
- (a) an identification number register for storing a unique identification number to identify each data transfer channel,
- (b) a data count controlling circuit for storing an integer number which is reset in such a way as to allow each data transfer channel to have an identical integer number, for updating the integer number held by a constant value according to a data strobe pulse received from said data transfer control circuit through said control bus with data sent out by said data transfer control circuit onto said data bus, and for delivering a count pulse when the integer number updated reaches a predefined value,
- (c) an address counter for storing a channel address which is set to allow each data transfer channel to have an identical channel address number and which is updated by a constant value each time said address counter receives a count pulse from said data transfer control circuit, and
- (d) a comparison circuit for selecting said data transfer buffer in said data transfer channel as a destination or source of data being transferred between said selected data transfer buffer and said data transfer control circuit through said data bus when the identification number held by said identification number register and the channel address held by said address counter coincide.

8. A data transfer unit as in claim 7, wherein:
- (a) said data transfer control circuit has a function of dividing an item of data into a predefined number of pieces of sub-data and of sequentially sending out said sub-data onto said data bus, and
- (b) said data count controlling circuit comprises:
  - (i) a data count register for storing a data count which is set to allow each data transfer channel to have an identical data count value,
  - (ii) a strobe counter for storing a first integer number which is reset to allow each data transfer channel to have an identical first integer number, for updating the first integer number held by a constant value each time said strobe counter receives a data strobe pulse from said data transfer control circuit, and for delivering an internal count pulse when the updated first integer number reaches a predefined number and resetting the updated first integer value again,
  - (iii) a data counter for holding a second integer number which is reset to allow each data transfer channel to have an identical second integer number, and for updating the second integer number held by a predefined value each time said data counter receives an internal count pulse from said strobe counter, and
  - (iv) a comparator for applying a count pulse to said address counter when the updated second integer number held by said data counter and the data count held by the data count register coincide.

9. A data transfer unit as in claim 7, wherein said data transfer channels each further include an I/O control circuit for alternating between (a) a channel address setting operation in which said I/O control circuit receives a header indicative of an address from said data transfer control circuit through said data bus and sends the received header to said address counter and (b) a data transfer operation in which said I/O control circuit forces said data transfer buffer to execute a transfer of data through said data bus or inhibits such a transfer of data depending upon the selection made by said comparison circuit, as long as said I/O control circuit continuously receives an operation mode switching signal indicating that a random transfer is designated from said data transfer control circuit through said control bus.

10. A method of transferring of data between one component of a first type and each of a plurality of components of a second type through a common bus, said data transfer method comprising steps of:
- (a) setting different identification numbers to said plurality of components of the second type,
- (b) setting said plurality of components of the second type to an identical address,
- (c) simultaneously updating the addresses held by said plurality of components of the said type by a constant value, and
- (d) selecting one of said plurality of components of the second type whose identification number coincides with the updated address, as a destination or source of data being transferred between said selected component of the second type and said component of the first type.

* * * * *

UNITED STATES PATENT AND TRADEMARK OFFICE
CERTIFICATE OF CORRECTION

PATENT NO. : 5,526,490
DATED : June 11, 1996
INVENTOR(S) : Nishikawa

It is certified that error appears in the above-identified patent and that said Letters Patent is hereby corrected as shown below:

Column 1, line 12, change "art" to --art.--.
Column 2, line 5, change "each" to --the--; and line 17, change "number," to --numbers,--.
Column 3, line 9, change "the" to --the ability to--; and line 10, delete "coexist with".
Column 5, line 51, change "EMBODIMENT" to --EMBODIMENT I--; and line 62, change "circuit" to --circuit 13,--.
Column 7, line 4, change "82" to --32--; and line 48, change "20-ID4" to --20-ID4.--.
Column 9, line 19, change "command" to --the command--; and line 20 change "hold" to --hold a--.
Column 10, line 21, change "37 0HIGH" to --HIGH--.
Column 12, line 65, change "5 by" to --by--.
Column 14, line 52, change 20-ID (i, J)" to --20-ID (i, j)--; and line 64, change 20-ID (m, n)o" to --20-ID (m, n).--.

In the Claims:

Claims 7, lines 35-37, change "a destination or source of data being transferred between said selected data transfer buffer and" to --the destination of data being transferred from--.
Claim 10, line 10, change "said" to --second--.

Signed and Sealed this

Sixth Day of February, 2001

Attest:

Q. TODD DICKINSON

*Attesting Officer*  *Director of Patents and Trademarks*